US010268396B2

(12) United States Patent
Janik

(10) Patent No.: US 10,268,396 B2
(45) Date of Patent: *Apr. 23, 2019

(54) SYSTEMS AND METHODS FOR MANAGING STORAGE ENDURANCE

(71) Applicant: SanDisk Technologies LLC, Plano, TX (US)

(72) Inventor: Gary Janik, Palo Alto, CA (US)

(73) Assignee: SanDisk Technologies LLC, Addison, TX (US)

( * ) Notice: Subject to any disclaimer, the term of this patent is extended or adjusted under 35 U.S.C. 154(b) by 9 days.

This patent is subject to a terminal disclaimer.

(21) Appl. No.: 15/683,756

(22) Filed: Aug. 22, 2017

(65) Prior Publication Data
US 2017/0351439 A1 Dec. 7, 2017

Related U.S. Application Data

(63) Continuation of application No. 14/661,971, filed on Mar. 18, 2015, now Pat. No. 9,766,819.

(60) Provisional application No. 62/098,321, filed on Dec. 30, 2014.

(51) Int. Cl.
G06F 3/06 (2006.01)

(52) U.S. Cl.
CPC .......... G06F 3/0611 (2013.01); G06F 3/0652 (2013.01); G06F 3/0655 (2013.01); G06F 3/0659 (2013.01); G06F 3/0679 (2013.01); G06F 3/0688 (2013.01)

(58) Field of Classification Search
CPC .... G06F 3/0611; G06F 3/0652; G06F 3/0655; G06F 3/0679

USPC .................................................. 711/154, 103
See application file for complete search history.

(56) References Cited

U.S. PATENT DOCUMENTS 6,041,394 A 3/2000 Halligan et al.
6,831,865 B2 12/2004 Chang et al.
6,948,026 B2 9/2005 Keays
6,973,531 B1 12/2005 Chang et al.
7,032,087 B1 4/2006 Chang et al.
7,287,118 B2 10/2007 Chang et al.
(Continued)

OTHER PUBLICATIONS

Janik,Gary et al., Non-Final Office Action dated Jul. 14, 2016 for U.S. Appl. No. 14/661,971.
(Continued)

Primary Examiner — Pierre Miche Bataille
(74) Attorney, Agent, or Firm — Vierra Magen Marcus LLP

(57) ABSTRACT

Storage divisions of a non-volatile storage medium may have a writable state and an unwritable state. Storage divisions may be reclaimed by, inter alia, resetting the storage division from an unwritable state to a writable state. Writable storage divisions may be used to service incoming storage requests. If no writable storage divisions are available, requests may stall. One or more storage divisions may be held in a writable state to avoid stall conditions. This, however, may increase the erase dwell time of the storage divisions, which can result in increased wear and reduce the usable life of the storage device. Storage divisions may be prepared for use such that the storage divisions are transitioned to a writable state such that erase dwell time of the storage divisions is reduced, and the storage divisions are available as needed to service incoming requests.

20 Claims, 11 Drawing Sheets

(56) References Cited

U.S. PATENT DOCUMENTS

| | | | |
|---|---|---|---|
| 7,669,092 B2 | 2/2010 | Murray | |
| 7,996,642 B1 | 8/2011 | Smith | |
| 8,032,724 B1 | 10/2011 | Smith | |
| 8,364,918 B1 | 1/2013 | Smith | |
| 9,336,133 B2 | 7/2016 | Sinclair | |
| 2010/0082995 A1* | 4/2010 | Dees | G06F 1/14 |
| | | | 713/178 |
| 2013/0179667 A1 | 7/2013 | Wang | |
| 2014/0003156 A1 | 1/2014 | He | |
| 2014/1018920 | 7/2014 | Sinclair | |
| 2014/0258775 A1* | 9/2014 | Flynn | G06F 11/073 |
| | | | 714/6.21 |
| 2016/0019137 A1 | 1/2016 | Ellis | |
| 2016/0162352 A1* | 6/2016 | Singhai | G06F 11/1048 |
| | | | 714/773 |
| 2016/0188219 A1* | 6/2016 | Peterson | G06F 3/0616 |
| | | | 711/103 |

OTHER PUBLICATIONS

Janik, Gary et al., Notice of Allowance dated May 8, 2017 for U.S. Appl. No. 14/661,971.

* cited by examiner

SYSTEMS AND METHODS FOR MANAGING STORAGE ENDURANCE

CROSS-REFERENCE TO RELATED APPLICATIONS

This application claims priority to U.S. patent application Ser. No. 14/661,971, filed Mar. 18, 2015, published as US 2016/0188221 on Jun. 30, 2016 and issued as U.S. Pat. No. 9,766,819 on Sep. 19, 2017, which claims priority to U.S. Provisional Patent Application No. 62/098,321, filed Dec. 30, 2014, each of which are incorporated by reference.

TECHNICAL FIELD

This disclosure relates to storage systems and methods for managing solid-state storage media and, in particular, to systems and methods for managing erase dwell.

BACKGROUND

A storage medium may comprise storage locations that are reinitialized each time new data is written thereto. As used herein, reinitializing a storage location refers to transitioning the storage location from an unwritable state to a writable state. In some embodiments, the writable state of a storage location comprises an erased state, and the unwritable state of the storage location comprises a non-erased state. Accordingly, reinitializing a storage location may comprise erasing the storage location. Erase operations may require more time to complete than other storage operations (e.g., 10 to 100 times longer than write and/or read operations). Accordingly, a storage controller may maintain a pool of erased storage locations so that storage requests do not stall while the storage locations needed to service the requests are erased.

Storage locations may have a limited useful life, which may be quantified in terms of the number of program and/or erase operations the storage locations can endure before failure. The useful life of a storage location may be further reduced by erase dwell. As used herein, "erase dwell" refers to the time during which a storage location is in an erased state. Accordingly, the erase dwell time of a storage location may refer to the time between erasure of the storage location and the time data is programmed on the storage location. What is needed are systems and methods for managing storage location initialization to prolong the usable lifetime of the storage medium.

DETAILED DESCRIPTION

Figure 1A:
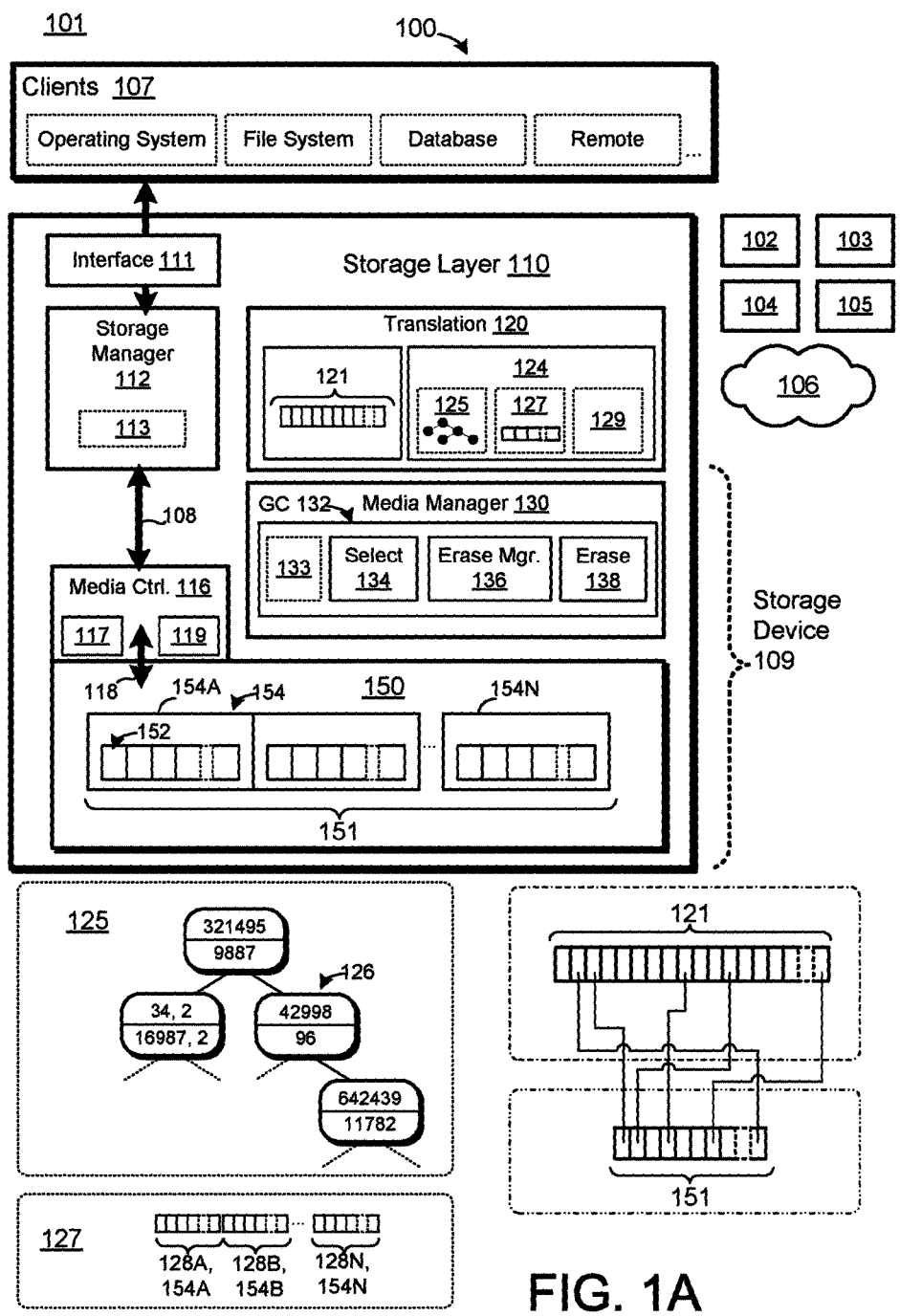
FIG. 1A is a block diagram of one embodiment of a storage layer.

A storage layer may manage a storage medium comprising a plurality of storage units. As used herein, a "storage unit" or "physical storage unit" refers to a storage resource and/or storage location capable of storing a quantum of data. A storage unit may include, but is not limited to: a page, a sector, a cell, a memory cell, a flash cell, a NAND cell, a block, a storage block, a group of physical storage resources (e.g., a set of two or more physical storage units), and/or the like. The storage medium may comprise "write-once" storage units (e.g., erasable storage units). As used herein, a "write-once" storage unit refers to a storage unit that is initialized each time data is written thereto. A write-once storage location may only be capable of being reliably programmed once, and must be erased before being reprogrammed. A write-once storage unit may have a "writeable," "initialized," "reset," or "erased" state in which the storage unit is capable of having data reliably written thereto, and an "unwritable," "written," "non-reset," and/or "non-erased" state in which the storage unit cannot be reliably programmed. A write-once storage location may be reset to a writable state. Resetting a storage unit may comprise erasing the storage unit, reinitializing the storage unit, clearing the storage unit and/or the like. The disclosure is not limited in this regard, however, and could be adapted for use with storage units having writable and/or unwritable states that correspond to any media state and/or condition.

Operations to reset storage units of the storage medium may be significantly slower than operations to read data from the storage units and/or program data to the storage units (e.g., reading data from a storage unit may be hundreds of times faster than resetting the storage unit, and tens of times faster than programming data to the storage unit). Accordingly, in some embodiments, storage units are arranged into reset groups (storage divisions). As used herein, a "storage division" refers to portions, sections, and/or regions within the storage medium. The storage divisions may comprise a set of two or more storage units. The storage units within a storage division may be managed as a group (e.g., may be reset as a group). Resetting a storage division may, therefore, comprise resetting the storage units of the storage division. A storage division may include, but is not limited to: an erase block, an erase division, an erase group, a logical erase block (e.g., a group, collection, and/or set of erase blocks), a reset group, a reset block, a logical reset block (e.g., a group, collection, and/or set of reset blocks), and/or the like. The storage layer may comprise a recovery module configured to reset storage divisions, such that the storage divisions can be used to service incoming storage requests. The recovery module may be configured to implement reset operations on selected storage divisions to transition the storage divisions to a writable state (e.g., erase the storage divisions). The recovery module may reset storage divisions as part of a garbage collection operation, as disclosed in further detail herein. The recovery module may be further configured to make the storage divisions available for servicing write requests (e.g., place the storage divisions that have been reset into a write queue). As disclosed in further detail herein, the recovery module may adapt reset operations on the storage divisions to reduce and/or minimize an erase dwell time of the storage divisions.

In some embodiments, write-once, asymmetric properties of the storage medium may be managed by use of an independent logical-to-physical translation layer between a logical address space corresponding to the storage medium and the storage address space of the storage medium. The logical-to-physical translation layer may comprise any-to-any mappings between the logical address space and physical storage resources, such that a logical identifier (LID) can map to any storage unit on the storage medium. The logical-to-physical translation layer may be leveraged to implement storage operations "out-of-place" on the storage medium. As used herein, writing data "out-of-place" refers to updating and/or overwriting data stored on a particular storage unit by writing the data to a different, available storage unit rather than overwriting the data "in-place." Due to the write-once characteristics of the storage medium, updating a particular storage unit in-place may be inefficient and result in write amplification, since an in-place update may comprise: a) reading unmodified data from the storage division comprising the particular storage unit, b) erasing the storage division, c) writing the updated data to the particular storage unit, and c) rewriting the unmodified data to the storage division. Updating and/or overwriting data out-of-place may avoid write amplification, since existing, valid data on the storage division need not be immediately erased and rewritten. Moreover, writing data out-of-place may remove erasure from the latency path of many storage operations. In some embodiments, data may be appended to an ordered storage log on the storage medium.

Writing data out-of-place, as disclosed above, may result in consuming an available write capacity of the storage medium. As used herein, the "write capacity" of the storage medium refers to the amount of storage units and/or storage divisions that available to service storage requests. Accordingly, the write capacity of the storage medium may correspond to the physical storage capacity of the storage units that are currently available for writing data (e.g., are currently in a writable state). Accordingly, the write capacity may differ from the available physical storage capacity of the storage medium, since the write capacity only includes storage units that are currently in a writable state, whereas the available physical storage capacity may include storage units that could be made available to store data, but are currently in an unwritable state. A write stall may occur when the available capacity of writable storage units is exhausted (and/or reaches a threshold). In a write stall state, storage requests that involve writing data to the storage medium may be stalled while additional write capacity is made available. Write stall conditions may significantly degrade performance due to, inter alia, asymmetry of reset operations relative to read and/or write operations.

In some cases, one or more writable storage divisions are maintained in reserve in order to prevent write stall conditions. However, the inventors have determined, through testing and experience, that holding storage units in a writable, erased state may wear the storage medium, which can result in reducing the usable life of the storage medium. As disclosed above, the storage medium may have a limited useful life, which may be defined in terms of the number of program and/or erase operations the storage medium is expected to endure before failure. The useful life of the storage medium may, however, be further reduced by erase dwell. As used herein, "erase dwell" refers to the time during which the storage medium is kept in an erased state. Accordingly, the erase dwell of a storage unit may comprise the time span from a) the time the storage unit was erased to b) the time data is programmed to the storage unit. In some embodiments, the erase dwell time of storage units may be reduced and/or minimized by adapting erase operations so that storage units transition to a writable state at the time the storage units are needed for data write operations, rather than holding writable storage units in a reserve pool.

As used herein, "invalid" data refers to data that does not need to be retained on the storage medium 150. Invalid data may include, but is not limited to: data that has been overwritten and/or modified out-of-place (e.g., data that has been rendered obsolete, as disclosed above); data that has been erased, deleted, cleared, removed, deallocated, unmapped, TRIMed; unused data; data that has been evicted from a cache; cache data that is discardable (e.g., has been written back to primary storage); and/or the like. Invalid data may be removed from the storage medium through garbage collection operations. As used herein, a "garbage collection" (GC) operation refers to an operation to remove invalid data from the storage medium and/or recover storage resources of the storage medium. A garbage collection operation may include a) selecting a storage division for the GC operation, and b) resetting the storage division (by use of the recovery module, as disclosed above).

In some embodiments, the garbage collector comprises a selector module that selects storage divisions to reclaim by use of a primary selection metric and/or criterion. The primary selection metric may comprise a "free space" or "invalid data" metric. The "free space" metric of a storage division may quantify the amount of storage capacity freed by recovering the storage division (e.g., the free space metric of a storage division having 90% of its physical storage capacity in use to store invalid data may be expressed as a percentage, a ratio, 0.9*SD_Capacity, where SD_Capacity is the physical storage capacity of the storage division, and/or the like). The "invalid data" metric may quantify the amount of invalid data stored within a storage division (e.g., 90% invalid). The metrics disclosed herein may be expressed in terms of percentages, ratios, physical storage capacity, and/or any other suitable mechanism.

The selector module may use the free space and/or invalid data selection metric to identify and/or select storage divisions comprising larger amounts of invalid data for recovery. In some embodiments, recovering a storage division having a large amount of invalid data is preferred since recovery operations on such storage divisions result in: a) lower write amplification (less valid data to relocate from the storage division); and b) increased available storage capacity. By contrast, recovering a storage division that primarily comprises valid data may result in: a) increased write amplification (larger amount of valid data for relocate), and b) freeing a smaller amount of storage capacity.

The storage medium may have a limited usable life, which may be quantified in terms of the number of program and/or erase cycles that the storage divisions are projected to be capable of enduring before becoming unusable. As used herein, an "unusable" storage division refers to a storage division that is no longer suitable for use to store data due to, inter alia, media failure, interconnect failure, write error rate, read error rate, write performance degradation, read performance degradation, erase performance degradation, and/or the like. The storage layer may be configured to manage wear levels of the storage divisions so that the storage divisions wear evenly (e.g., prevent particular storage divisions from being used more heavily than other storage divisions, which may result in exhausting the usable life of the particular storage divisions prematurely). As used herein, "wear leveling" refers to managing wear conditions on the storage medium, such that wear is distributed evenly throughout the storage address space of the storage medium (e.g., distributed evenly across storage divisions and/or the storage units thereof). As used herein, a "wear condition" or "wear event" refers to any operation that consumes the usable life of a portion of the storage medium (e.g., a storage division and/or storage unit). Accordingly, wear conditions and/or wear events may include, but are not limited to: program and/or write cycles, read operations, erase operations, reset operations, initialization operations, program/erase (PE) cycles, erase dwell, and/or the like. The amount of wear incurred on a storage division may be quantified by use of a wear metric, which may correspond to one or more of: program and/or write cycle count, read operation count, erase cycle count, reset cycle count, initialization cycle count, PE cycle count, erase dwell time, error rate, and/or the like. Storage divisions may be retired in response to the wear metric of the storage division exceeding a threshold. A remaining life metric may quantify the amount of remaining life of a storage division, and may correspond to one or more of: remaining number of PE cycles the storage division is projected to be capable of enduring, projected error rate, and so on. The remaining life metric of a storage division may be derived from the wear metric of the storage division (e.g., the remaining life metric of the storage division may be inversely proportional to the wear metric of the storage division).

In one embodiment, the selector module is configured to adapt the primary selection metric and/or criterion to wear level the storage medium, while reducing write amplification. In one embodiment, the selector module modifies the invalid data metric to calculate a granular invalid data metric (e.g., granularize and/or quantize the amount of invalid data in the storage divisions). As used herein, a "granular invalid data metric" refers to a metric that quantifies the amount of invalid data in a storage division in terms of "granules" and/or "recovery blocks" (RB), which may represent a different quantum of storage capacity than the underlying block size of the storage division (e.g., may differ from the physical storage capacity of the storage units within the storage division, storage block size, packet size, and/or the like). Calculating a "granular invalid data metric" of a storage division may, therefore, comprise mapping the amount of invalid data stored within the storage division to a different, discrete set of RB, which may correspond to a particular percentage of the full storage division capacity. In one embodiment, a storage division may comprise 1 K storage units, each having an 8 K physical storage capacity (e.g., the storage division may have a physical storage capacity of 8 MB). Accordingly, the "raw" or "full-resolution" invalid data metric for the storage division may be defined in terms of the 8 K blocks, in accordance with the storage unit size. The RB may be defined in terms of 64 K blocks. Therefore, the granular invalid data metric for a storage division in which 896 of the 8K storage units comprise invalid data may be calculated as 112 recovery blocks (7168 K of invalid data quantized to 64 K RB). Invalid data values that do not map directly within a discrete RB may be rounded up or down according to a quantization policy. Although particular embodiments of granular metrics are described herein, the disclosure is not limited in this regard, and could be adapted to determine granular metrics using any suitable quantization, granularization, and/or data mapping technique.

The selector module may select storage divisions for recovery by use of the granular invalid data metrics, disclosed above. In accordance with the greedy algorithm, the selector module may select storage divisions having higher granular invalid data metrics over storage divisions having lower granular invalid data metrics. The granular invalid data metrics disclosed herein may have a lower resolution than the full-resolution, or raw invalid data metrics associated with the storage divisions (e.g., the invalid data metrics of the storage divisions may be defined in terms of 8 K blocks, whereas the granular invalid data metrics are defined in terms of larger, 64 K RB). Accordingly, storage divisions having similar, but not equal, amounts of invalid data may correspond to the same quantized invalid data metric. In some embodiments, the selector module is configured to apply a secondary selection metric to select one of two or more storage divisions having the same quantized invalid data metrics (and/or quantized invalid data metrics within a threshold). The secondary selection metric may be configured to wear level the storage medium and, as such, may correspond to a wear level of the two or more storage divisions (e.g., may select the storage division having the lower wear level and/or greater remaining life metric). Alternatively, or in addition, the secondary selection metric may correspond to data retention time, such that the storage division with the longest time data retention is selected for recovery. As used herein, the "data retention time" of a storage division refers to the length of time data has remained on the storage division. The data retention time of a storage division may refer to the time that has elapsed since the storage division was closed (e.g., since the storage units thereof were programmed). Alternatively, the data retention time may be defined as the time elapsed since the storage division was initialized and/or since data was first programmed to the storage division after initialization (e.g., time elapsed since the storage division was erased, reset, recovered, cleared, and/or the like).

In some embodiments, the selector module is further configured to implement an adaptive comparison of invalid data metrics pertaining to the storage units. As used herein, an adaptive comparison refers to a comparison criterion that is a function of the relative amounts of invalid data within the storage divisions. The adaptive comparison may, therefore, be configured to adjust the resolution of the invalid data comparison criterion (e.g., weight differences in invalid data metrics of the storage divisions) in accordance with the amount of invalid data within the storage divisions. In one embodiment, the adaptive comparison is configured to reduce the weight of differences in the invalid data metrics when comparing storage divisions comprising relatively large amounts of invalid data (since small differences in the overall amount of invalid data in the respective storage divisions is unlikely to significantly affect write amplification). By contrast, differences in the invalid data metrics of storage divisions comprising smaller amounts of invalid data may be weighted more heavily (since recovery of such storage divisions is likely to create significantly more write amplification). In one embodiment, the adaptive comparison may comprise a logarithmic comparison of the invalid data metrics of the storage divisions (e.g., the approximate base 2 log of the raw and/or granular invalid data metrics disclosed above). Storage divisions that result in similar adaptive comparison results (and/or within a threshold) may be selected by use of a secondary selection metric, as disclosed above (e.g., based on wear level, data retention time, and/or the like). Although particular embodiments of adaptive comparisons are described herein, the disclosure is not limited in this regard and could be adapted to implement an adaptive comparison of invalid data metrics (raw and/or granular) using any suitable technique.

In some embodiments, the selector module is configured to override the primary selection metric and/or criterion with an alternative selection metric and/or criterion. The alternative selection metric may be adapted to wear level the storage medium, such that storage divisions having lower levels of wear are selected for GC and/or recovery over storage divisions having lower levels of wear, despite differences in the amount of invalid data on the respective storage divisions. The alternative selection metric may prevent storage divisions comprising "cold" and/or write-once-read-many (WORM) data from disuse and/or avoid concentration of PE cycles in certain storage divisions. Overriding the primary selection metric may comprise selecting a storage division to recover based on wear level and/or remaining life of the storage division as opposed to an invalid data metric. Storage divisions selected using a wear level selection metric may result in increased write amplification (and/or free less storage capacity than a recovery operation on a storage division comprising a larger amount of invalid data). Accordingly, the selector module may limit overrides of the primary selection metric to particular conditions. In one embodiment, the selector module may override the primary selection metric with the alternative selection metric in response wear level conditions on the storage medium. In particular, the selector module may override the primary selection metric in response to determining that storage division wear is not being evenly distributed across the storage divisions. In one embodiment, the selector module is configured to override the primary selection metric in response to a difference between the wear level and/or remaining life metric of a storage division exceeding a threshold. Alternatively, or in addition, the selector module may be configured to override the primary selection metric in response to deltas, variances and/or deviation between wear level metrics of the storage divisions exceeding a threshold. In some embodiments, the selector module may further limit overrides of the primary selection metric to a particular period and/or frequency (e.g., an override per N selections using the primary selection metric).

Disclosed herein are embodiments of apparatus, systems, and methods for managing erase operations on a storage medium. Embodiments of the disclosed apparatus may comprise a storage manager configured to write data to a first storage division of a solid-state storage medium, and an erase manager configured to initiate an erase operation on a second storage division of the solid-state storage medium in response to the storage manager writing data to a threshold number of storage units of the first storage division. The erase operation may be initiated such that the erase operation completes before the writing of data to the first storage division. The erase manager may be configured to delay the erase of the second storage division until the threshold number of storage units of the first storage division are filled. The erase operation may be configured to reset the second storage division from an unwritable state to a writable state. The erase manager may be configured to retain the second storage division in the unwritable state until data is programmed to the threshold of the storage capacity of the first storage division.

The threshold may be based on one or more of a projected fill time of the first storage division and a projected latency of the erase operation on the second storage division. The erase manager may be configured to determine the projected fill time of the first storage division based on one or more of a wear level of the first storage division, measured program latency of the first storage division, measured program latency of a plurality of storage divisions of the solid-state storage medium, and a projected rate for write operations on the first storage division. The projected latency of the erase operation on the second storage division may be based on one or more of a wear level of the second storage division, latency for previous erase operations performed on the second storage division, and a latency for previous erase operations on other storage divisions of the solid-state storage medium.

Embodiments of the apparatus disclosed herein may further include a storage division selector configured to select the second storage division for recovery. The erase manager may be configured to delay the erase operation on the second storage division in response to selection of the second storage division for recovery by the storage division selector.

The erase manager is configured to delay the erase of the second storage division until the storage manager writes data to a third storage division of the solid-state storage medium. The storage manager may be configured to service write requests by sequentially writing data at an append point within the first storage division, and wherein the erase manager is configured to delay the erase operation on the second storage division based on a projected fill time of the first storage division.

The apparatus may further include a garbage collector configured to prepare the second storage division for the erase operation by, inter alia, relocating valid data stored on the second storage division to one or more other storage divisions of the solid-state storage medium, wherein the erase manager delays the erase operation on the second storage division after valid data is relocated from the second storage division.

Disclosed here are embodiments of a system for managing erase operations on a storage medium. Embodiments of the disclosed system may comprise a log storage module configured to append data to a storage log at an append point within a current erase block of a non-volatile storage medium, a recovery module configured to select another one of the plurality of erase blocks for use as a next append point for the log storage module, wherein the selected erase block is in an unwritable state, and an initialization module configured to hold the selected erase block in the unwritable state for an erase delay period. The erase delay period may correspond to programming data to a predetermined number of pages within the current erase block. The initialization module may be configured to start an operation to transition the selected erase block to the writable state in response to programming data to the predetermined number of pages within the current erase block. The initialization module may be configured to transition the selected erase block to the writable state in response to appending a threshold amount of data within the current erase block. The erase delay period may be configured to schedule completion of the operation to transition the selected erase block to the writable state at a projected fill time of the current erase block. The erase delay period may correspond to a difference between a) a projected fill time of the current erase block, and b) a projected latency of an erase operation to transition the selected erase block to a writeable state. In some embodiments, the erase delay period is based on write rate projection, and wherein the initialization module determines the write rate projection by monitoring write operations performed by the log storage module.

Disclosed herein are embodiments of a method for managing a storage medium, comprising programming data to erased storage locations within respective erase divisions of a solid-state storage medium, minimizing an erase dwell time of the erased divisions by leaving erase divisions in a non-erased state until a write capacity threshold is satisfied, wherein the write capacity threshold corresponds to a storage capacity of erased storage locations on the solid-state storage medium, and transitioning a selected erase division to an erased state in response to determining that the write capacity condition is satisfied. Satisfying the write capacity condition may comprise determining that that solid-state storage medium comprises fewer than a threshold number of erased storage locations. Embodiments of the disclosed method may further include scheduling two or more erase operations to transition different respective sets of storage locations of the selected erase division to the erased state.

In some embodiments, the disclosed method further comprises programming data to a first one of a plurality of erase divisions of the solid-state storage medium, and determining that the write capacity threshold is satisfied in response to filling a threshold portion of a storage capacity of the first erase division. Embodiments of the method disclosed herein may include preparing the selected erase division to be erased, and leaving the selected erase division in the non-erased state after preparing the selected erase division to be erased until the write capacity condition is satisfied. Preparing the selected erase division to be erased may comprise relocating valid data stored on the selected erase division to one or more other erase divisions of the solid-state storage medium.

Disclosed herein are apparatus, systems, and methods for selecting storage divisions for recovery. Embodiments of the disclosed apparatus may comprise a storage controller configured to write data to storage divisions of a solid-state storage medium, a garbage collector configured to reclaim storage divisions for use by the storage controller, and a garbage collection selector configured to select storage divisions for the garbage collector to reclaim capacity by use of a first selection metric, wherein the garbage collection selector is configured to override the first selection metric with a second, different selection metric that corresponds to a wear level of the respective storage divisions in response to differences in the amount of wear on one or more of the storage divisions exceeding a threshold. The garbage collection selector may be configured to calculate the wear variance between the one or more storage divisions as a difference between a wear level of the respective storage divisions and an average wear level of the storage divisions. The garbage collection selector may be configured to determine the wear level between the two or more storage divisions by use of a wear distribution of the storage divisions. The garbage collection selector may be configured to override the first selection metric in response to a difference between a highest wear level of the storage divisions and a lowest wear level of the storage divisions exceeding the threshold. The garbage collection selector may be further configured to limit overrides of the first selection metric in accordance with a predetermined override rate. In some embodiments, the garbage collection selector limits overrides of the first selection metric to one override per N storage division selections made by use of the first selection metric.

The first selection metric may quantify an amount of invalid data stored on the respective storage divisions. Overriding the first selection metric may comprise selecting a storage division to reclaim based on wear levels of the respective storage divisions, independent of the amount of invalid data stored on the respective storage divisions. In one embodiment, the storage divisions comprise a plurality of storage blocks. The first selection metric may quantify storage capacity that would be freed by reclaiming the respective storage divisions in terms of virtual storage blocks that correspond to a physical storage capacity of two or more storage blocks of the storage divisions. The first selection metric may exclude storage divisions comprising less than a threshold amount of invalid data from being selected to reclaim. In some embodiments, the first selection metric corresponds to a logarithm of an amount of invalid data stored within the respective storage divisions.

Disclosed herein are embodiments of a system for selecting storage divisions for recovery. Embodiments of the disclosed system may comprise a storage module configured to manage a storage medium comprising a plurality of erase divisions, each erase division comprising a plurality of physical storage locations, a selector module configured to select an erase division to initialize for use in servicing write requests by the storage module, wherein selecting the erase division to initialize comprises calculating an amount of invalid data within the erase divisions in terms of a recovery block size, wherein the recovery block size exceeds a storage capacity of the respective physical storage locations of the erase divisions, selecting the erase division to initialize based on an adaptive comparison of the calculated amounts of invalid data within the respective erase divisions, and a garbage collector to recover the selected erase division for reuse by the storage module in response to the selection. The selector module may be configured to exclude erase divisions having less than a threshold amount of invalid data from the selection.

The selector module may be further configured to determine a deviation of wear metrics of the erase divisions, wherein the wear metric of an erase division is based on one or more of a program count of the erase division, an erase count of the erase division, a PE cycle count of the erase division, and an error rate of the erase division. The selector module may be further configured to select the erase division to initialize based on wear metrics of the erase divisions in response to the deviation of the wear metrics of the erase divisions exceeding a threshold.

Disclosed herein are embodiments of a method for selecting an erase block for recovery. The disclosed method may comprise maintaining storage metadata pertaining to erase blocks of a solid-state storage medium, the storage metadata comprising a remaining life metric that corresponds to a projected remaining usable life of the respective erase blocks, and a free space metric that quantifies an amount of storage capacity freed by resetting the respective erase blocks to a writeable state, selecting an erase block to reset by determining a deviation within the remaining life metrics, selecting the erase block to reset based on the remaining life metrics of the erase blocks in response to determining that the determined deviation satisfies a deviation threshold, and selecting the erase block to reset based on the free space metrics of the erase blocks in response to determining that the determined deviation does not satisfy the deviation threshold. The method may further include resetting the selected erase block to a writeable state.

In some embodiments, the method further comprises determining the free space metric of an erase block by quantizing an amount of data stored on the erase block that does not need to be retained on the solid-state storage medium in terms of discrete blocks, each discrete block representing a physical storage capacity greater than a physical storage capacity of a physical page. Alternatively, or in addition, the disclosed method may include determining logarithmic free space metrics of the erase blocks, wherein the logarithmic free space metric of an erase block comprises a logarithm of a number of physical pages within the erase block that store invalid data, wherein selecting the erase block to reset based on the free space metrics comprises comparing the logarithmic free space metrics of the respective erase blocks.

Selecting the erase block to reset based on the free space metrics may comprise selecting the erase block that would free the most physical storage capacity in response to being reset. Alternatively, or in addition, selecting the erase block to reset based on the free space metrics may comprise selecting the erase block to reset by comparing remaining life metrics of a set of two or more erase blocks having free space metrics that differ by less than a threshold. The remaining life metric of a storage division may correspond to one or more of: program count, erase count, program erase cycle count, and error rate. Embodiments of the disclosed method may further include limiting use of the remaining life metrics to select the erase block to reset in accordance with a predetermined rate.

FIG. 1A is a schematic block diagram of one embodiment 101 of a computing system 100 comprising a storage services layer (storage layer 110). In some embodiments, the storage layer 110 comprises a computing system 100 (and/or may be configured for operation on a computing system 100). The computing system 100 may comprise one or more computing devices, including, but not limited to: a server, a desktop, a laptop, an embedded system, a mobile device, a storage device, a network-attached storage device, a storage appliance, a plurality of computing devices (e.g., a cluster), and/or the like. The computing system 100 may comprise processing resources 102, memory resources 103 (e.g., volatile random access memory (RAM)), non-transitory storage resources 104, and/or a communication interface 105. The processing resources 102 may include, but are not limited to: general purpose central processing units (CPUs), ASICs, programmable logic elements, FPGAs, programmable logic arrays (PLGs), and/or the like. The communication interface 105 may be configured to communicatively couple the computing system 100 to a network 106. The network 106 may comprise any suitable communication network, including, but not limited to: a Transmission Control Protocol/Internet Protocol (TCP/IP) network, a Local Area Network (LAN), a Wide Area Network (WAN), a Virtual Private Network (VPN), a Storage Area Network (SAN), and/or the like.

As disclosed in further detail herein, the storage layer 110 may comprise an interface 111, a storage manager 112, a media controller 116, a translation module 120, and a media manager 130. The storage layer 110 (and/or modules, components, and/or functionality thereof) may be implemented in software, hardware, and/or a combination of software and hardware elements. In some embodiments, portions of the storage layer 110 are embodied as executable instructions stored on a non-transitory, machine-readable storage medium. The instructions may comprise computer program code that, when executed by a processor and/or computing device, causes the processing resources 102 of the computing system 100 to implement certain processing steps, procedures, and/or operations disclosed herein. The storage layer 110, and/or portions thereof, may be implemented and/or embodied as a driver, a library, an interface, an API, FPGA configuration data, firmware (e.g., stored on an Electrically Erasable Programmable Read-Only Memory (EEPROM) and/or the like), and/or the like. Accordingly, portions of the storage layer 110 may be accessed by and/or included within other modules, processes, and/or services (e.g., incorporated within a kernel layer of an operating system of the computing system 100). In some embodiments, portions of the storage layer 110 are embodied as machine components, such as general and/or application-specific devices, including, but not limited to: circuits, integrated circuits, processing components, interface components, hardware controller(s), storage controller(s), programmable hardware, FPGAs, ASICs, and/or the like. The modules disclosed herein may be referred to as controllers, layers, services, engines, facilities, drivers, circuits, and/or the like. Therefore, in some embodiments, the storage layer 110 may be referred to as a storage device, storage controller, storage manager, storage layer, storage engine, storage facility, storage driver, storage circuit, and/or the like.

The storage layer 110 may be configured to provide I/O and/or storage services to clients 107, which may include, but are not limited to: operating systems, file systems, journaling systems, key-value storage systems, database systems, applications, users, remote storage clients, and/or the like. The clients 107 may further include, but are not limited to: components of a virtualized computing environment, such as hypervisors, virtualization kernels, guest operating systems, virtual machines, and/or the like. The storage layer 110 may comprise an interface 111 through which the clients 107 access the storage services of the storage layer 110. The interface 111 may include one or more block storage interfaces, object storage interfaces, file storage interfaces, key-value storage interfaces, storage namespaces, database storage interfaces, directory storage interfaces, virtualized storage interfaces, Virtual Storage Unit (VSU) interfaces, Logical Unit Number (LUN) interfaces, virtual LUN (vLUN) interfaces, logical address spaces, and/or the like.

The storage layer 110 may service storage requests received through the interface by implementing storage operations on a storage medium 150 using, inter alia, the storage manager 112, media controller 116, translation layer 120, and/or media manager 130. The storage medium 150 may comprise non-volatile and/or persistent storage medium including, but not limited to: flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), Resistive Random-Access Memory (RRAM), Programmable Metallization Cell (PMC), Conductive-Bridging RAM (CBRAM), Magneto-Resistive RAM (MRAM), Dynamic RAM (DRAM), Phase change RAM (PRAM), and/or the like. Alternatively, or in addition, the storage medium 150 may comprise volatile storage resources, which may include, but are not limited to: RAM, dynamic RAM (DRAM), static RAM (SRAM), synchronous dynamic RAM (SDRAM), cache memory resources, graphics memory resources, and/or the like.

The storage medium 150 may comprise a plurality of storage units 152, which may be grouped, organized, arranged and/or partitioned into respective storage divisions 154. As disclosed above, a "storage unit" or "physical storage unit" refers to a storage resource capable of storing a quantum of data. In the FIG. 1A embodiment, a storage unit 152 may include, but is not limited to: a page, a sector, a cell, a memory cell, a flash cell, a NAND cell, a block, a logical storage unit (e.g., a group or set of storage locations), and/or the like. The storage units 152 may, therefore, comprise storage locations that the storage manager 112 may use to service storage requests. In some embodiments, a storage unit 152 may comprise a plurality of physical storage locations on different respective storage elements, as disclosed below in conjunction with FIG. 1B.

As disclosed herein, the storage medium 150 may comprise "write-once" storage units 152. As used herein, a "write-once" storage unit 152 refers to a storage unit 152 that is initialized each time data is written thereto. A write-once storage unit 152 may only be capable of being reliably programmed once, and must be erased before being reprogrammed. A write-once storage unit 152 may have a writeable state in which the storage unit 152 is capable of having data reliably written thereto, and an unwritable state in which the storage unit 152 cannot be reliably programmed. The storage layer 110 may comprise an erase module 138 configured to transition a storage division 154 (and the storage units 152 therein) to a writable state, which may comprise resetting the storage division 154, clearing the storage division 154, erasing the storage division 154, and/or the like. The disclosure is not limited in this regard, however, and could be adapted for use with storage units 152 and/or storage divisions 154 having writable and/or unwritable states that correspond to any media state and/or condition.

Reset operations may be significantly slower than other storage operations on the storage medium 150 (e.g., reading data from a storage unit 152 may be hundreds of times faster than resetting the storage unit 152, and tens of times faster than programming data to the storage unit 152). Accordingly, in some embodiments, storage units 152 are grouped, arranged, and/or partitioned into respective storage divisions 154. As disclosed above, a storage division 154 refers to a portion, section, and/or segment of the storage medium 150. A storage division 154 may comprise two or more storage units 152. The storage units 152 within a storage division 154 may be managed as a group (e.g., may be initialized as a group). Resetting a storage division 154 may comprise resetting the storage units 152 within the storage division 154. The storage divisions 154 of FIG. 1A may comprise, but are not limited to: erase blocks, erase divisions, erase groups, logical erase blocks (e.g., groups, collections, and/or sets of erase blocks), reset groups, reset blocks, logical reset blocks (e.g., groups, collections, and/or sets of reset blocks), and/or the like. In some embodiments, a storage unit 152 may comprise a plurality of physical erase blocks on different respective storage elements, as disclosed below in conjunction with FIG. 1B.

The storage units 152 and/or storage divisions 154 may be addressable within a storage namespace of the storage medium 150 (storage address space 151). The storage address space 151 may include, but is not limited to: storage addresses, storage identifiers, physical addresses, physical storage addresses, physical identifiers, physical storage identifiers, media addresses, media identifiers, back-end addresses, back-end identifiers, address offsets, and/or the like. The storage address space 151 may correspond to any suitable storage addressing scheme, namespace, arrangement, and/or organization of storage resources.

The storage medium 150 may be communicatively coupled to an interconnect 108. The interconnect 108 may include, but is not limited to: a peripheral component interconnect (PCI), a PCI express (PCI-e) bus, a Serial AT Attachment (serial ATA or SATA) bus, a parallel ATA (PATA) bus, a Small Computer System Interface (SCSI) bus, an IEEE 1394 (FireWire) interface, a Fiber Channel interface, a Universal Serial Bus (USB) connection, and/or the like. In some embodiments, the storage medium 150 comprises a remote storage medium and/or device that are communicatively coupled to the storage layer 110 through the network 106. The interconnect 108 may, therefore, comprise one or more of: a network connection and/or interface, a storage network interface, a Storage Area Network (SAN) interface, a Virtual Storage Area Network (VSAN) interface, a remote bus, a PCE-e bus, an Infiniband connection, a Fibre Channel Protocol (FCP) network connection, a HyperSCSI interface, and/or the like.

In some embodiments, the storage medium 150 and/or storage layer 110 are embodied on a storage device 109. The storage device 109 may comprise one or more of: an on-board storage device of the computing system 100 (e.g., a chip, components, and/or module of the computing system 100), an expansion card communicatively coupled to an I/O bus of the computing system 100 (e.g., a PCIe card), a storage resource communicatively coupled to a storage bus of the computing system 100 (e.g., a storage drive communicatively coupled to a SATA bus of the computing system 100), an external storage device communicatively coupled to an external bus of the computing system 100 (e.g., USB, Firewire, and/or the like), a storage appliance (e.g., an independent, stand-alone computing device, storage server, etc.), and/or the like. Portions of one or more of the storage layer 110, storage manager 112, media controller 116, translation module 120, media manager 130, and/or other modules, components, and/or facilities disclosed herein may be implemented on the storage device 109. Accordingly, in some embodiments, the modules, components, elements and/or facilities disclosed herein may be embodied as circuits, controllers, programmable logic hardware, configuration firmware of the storage device 109 (and/or computing system 100), and/or the like.

The media controller 116 may be configured to implement storage operations on the storage medium 150, which may include, but are not limited to: writing data to storage unit(s) 152 of the storage medium 150 (by use of a write module 117), reading data from storage unit(s) 152 of the storage medium 150 (by use of a read module 119), initializing storage units 152 (e.g., erasing and/or resetting storage divisions 154), detecting and/or correcting errors, and so on. The media controller 116 may comprise software and/or hardware components including, but not limited to: one or more drivers and/or other software modules operating on the computing system 100, such as firmware, storage drivers, I/O drivers, filter drivers, and/or the like; hardware components, such as hardware controllers, programmable controllers, circuits, communication interface(s), and/or the like; and so on. In one embodiment, the storage medium 150 and/or media controller 116 are embodied on a storage device 109.

The media controller 116 may comprise circuitry, buffers, buses, bus interfaces, communication interfaces (e.g., direct memory access (DMA) controllers) configured to: access data for storage on the storage medium 150, program data to respective storage units 152 of the storage medium 150, read data stored on storage units 152 of the storage medium 150, provide data read from the storage medium 150 to client(s) 107 (e.g., through the interconnect 108 and/or other communication interface), and/or reinitialize storage units 152, as disclosed in further detail herein. The media controller 116 may be further configured to gather profiling information pertaining to storage operations performed on the storage medium 150, such as the error rate(s) of storage operations on particular storage divisions 154 and/or storage units 152, wear levels of the storage divisions 154 (e.g., program erase counts), erase dwell time of the storage divisions 154 (e.g., time span from a reset operation on a storage division 154 to the time data is programmed thereto), erase latency (e.g., time to implement an erase and/or reset operation on the storage divisions 154), write latency (e.g., time to write data to a storage division 154 and/or storage units 152 within a storage division 154), and so on. The media controller 116 may report the profiling metadata to the storage manager 112, which may record the profiling information in the profiling metadata 129.

Figure 1B:
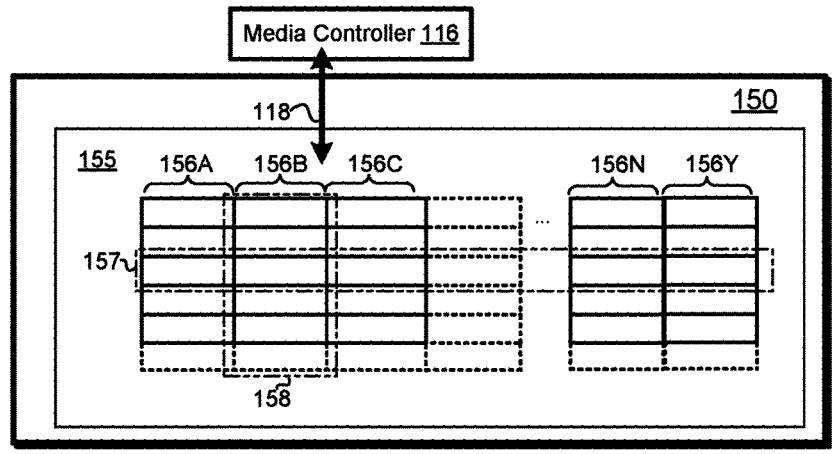
FIG. 1B is a schematic block diagram depicting one embodiment of a storage array.
Figure 1B:
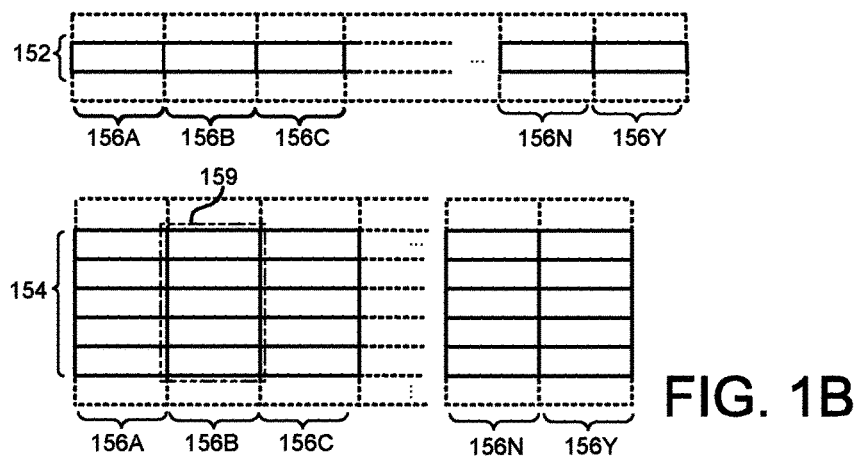

Referring to FIG. 1B, in some embodiments, the storage medium 150 comprises a storage array 155 that includes a plurality of storage elements 156A-Y (e.g., columns 158). As used herein, a storage element 156A-Y includes, but is not limited to: solid-state storage resources embodied as a package, chip, die, plane, printed circuit board, and/or the like. The storage array 155 of FIG. 1B comprises a set of two or more independent columns 158, comprised of one or more storage elements 156A-Y. The rows 157 of the array 155 may comprise storage units 152 of the respective columns 158 (e.g., storage elements 156A-Y). The storage elements 156A-Y comprising the storage array 155 may be capable of independent operation. Accordingly, a first one of the storage elements 156A may be capable of performing a first storage operation while a second storage element 156B performs a different storage operation. In one embodiment, the storage element 156A may be configured to read data at a first storage address, while another storage element 156B reads data at a different storage address.

The storage elements 156A-Y of the storage array 155 may be communicatively coupled to the media controller 116 by a bus 118. The bus 118 may be configured to communicatively couple the storage elements 156A-Y in parallel, such that the media controller 116 is capable of communicating with each of the respective storage elements 156A-Y independently. Alternatively, or in addition, portions of the bus 118 may be shared between storage elements 156A-Y.

The media controller 116 may perform storage operations in parallel on multiple storage elements 156A-Y. In one embodiment, the media controller 116 arranges the physical storage resources of the storage array 155 to form storage units 152 and/or storage divisions 154 that span multiple storage elements 156A-Y. The media controller 116 may perform write and/or read operations on storage units 152 comprising rows 157 within the storage array 155. As used herein, a row 157 of the storage array 155 refers to a combination of two or more physical storage locations on respective storage elements 156A-Y of the storage array 155 (e.g., on different respective columns 158). Accordingly, a storage unit 152 within the storage array 152 may comprise a plurality of individual physical storage locations, spanning a row 157 within the storage array 155. As illustrated in FIG. 1B, a storage unit 152 of the storage array 155 may comprise a plurality of physical storage location(s) within a plurality of different storage elements 156A-Y (within a row 157 of the storage array 155). Programming data to a storage unit 152 of the storage array 155 may, therefore, comprise programming data to a plurality of different physical storage locations on a plurality of different storage elements 156A-Y. A storage division 154 of the storage array 155 may comprise a plurality of erase blocks 159 within respective columns 158 (e.g., a row 157 of erase blocks 159). Accordingly, resetting a storage division 154 of the storage array 155 may comprise resetting a plurality of erase blocks 159 on respective storage elements 156A-Y. Although a particular configuration of a storage array 155 is described herein, the disclosure is not limited in this regard and could be adapted to manage storage units 152 and/or storage divisions 154 corresponding to any suitable arrangement of storage elements 156A-Y, storage arrays 155, banks, and/or the like.

Figure 1C:
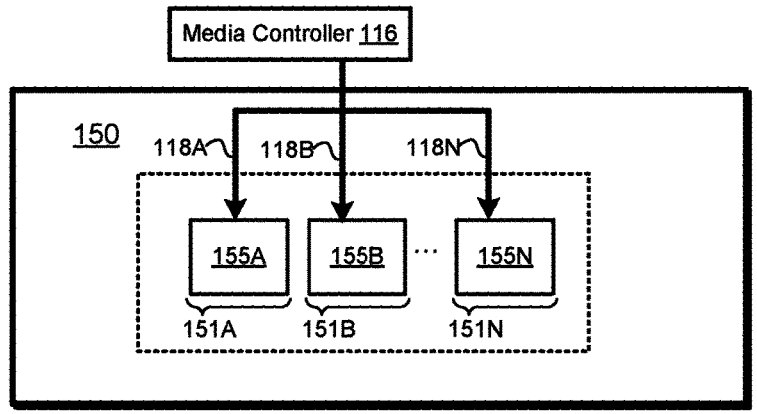
FIG. 1C is a schematic block diagram depicting one embodiment of a storage medium comprising multiple banks.

FIG. 1C depicts one embodiment of storage medium 150 comprising a plurality of independent banks 151A-N, each comprising one or more storage arrays 155A-N. Each of the independent banks 151A-N may be communicatively coupled to the media controller 116 via a respective bus 118A-N. The media controller 116 may be configured to perform storage operations on the respective banks 151A-N independently (e.g., may interleave storage operations between the different banks 151A-N). In some embodiments, the storage units 152 and/or storage divisions 154 may be organized within respective banks 151A-N (e.g., within respective storage arrays 155A-Y). In alternative embodiments, storage units 152 and/or storage divisions 154 may span two or more banks 151A-N and/or storage arrays 155A-N.

Referring back to FIG. 1A, the media controller 116 may be configured to, inter alia, manage data errors pertaining to storage operations on the storage medium 150. In some embodiments, media controller 116 comprises a write module 117 configured to program data segments to the storage medium 150. As used herein, a data segment refers to any quantum of data including, but not limited to: data pertaining to a storage request, data corresponding to one or more logical identifiers, one or more data blocks, unstructured data (e.g., data blobs), structured data, a data packet 145 (disclosed below), a data container, a data set, a data range, a data extent, a data record, an object, a data object, and/or the like. The write module 117 may comprise circuits, buffers, and/or modules to generate and/or write error recovery data corresponding to the data segments, which may include, but are not limited to: error-correcting code (ECC) data, redundant data, parity data, and/or the like. The write module 117 may include an ECC encode circuit configured to encode data segments for storage on the storage medium 150 as ECC codewords and/or with ECC syndromes. The media controller 116 may further include a read module 119 configured to identify and/or correct data errors by use of error recovery data on the storage medium 150. The read module 119 may include an ECC decode circuit configured to identify and/or correct data errors in the ECC encoded data read from the storage medium 150. In some embodiments, the media controller 116 further includes a media tuning circuit configured to adjust media tuning parameters used to read data from the storage medium 150 (e.g., modify bit detection thresholds and/or the like) and/or a parity substitution circuit configured to correct data errors by use of parity substitution operations, as disclosed herein.

As disclosed above, the media controller 116 may be configured to store data redundantly and/or with parity data. Referring to the storage array 155 illustrated in FIG. 1B, the media controller 116 may be configured to store data redundantly on two or more different storage elements 156A-Y (e.g., two or more different columns 158 of the storage array 155). Data that cannot be recovered from a first one of the storage elements 156A-Y may be read from a different one of the storage elements 156A-Y. Alternatively, or in addition, the media controller 116 may be configured to store parity data on the storage array 155. In one embodiment, the media controller 116 is configured to store data within respective rows 157 of the storage array 155 (e.g., store data to a plurality of different storage elements 156A-Y in parallel). The media controller 116 may use one of the storage elements (e.g., storage element 156Y) to store parity data corresponding to data stored in other storage elements 156A-N of the storage array 155. Accordingly, an operation to program data to particular row 137 may comprise a) calculating parity data corresponding to the data to be programmed to the storage elements 156A-N, and b) programming the data to storage elements 156A-N and programming the parity data to storage element 156Y. An error pertaining to data stored in one or more of the storage elements 156A-N that cannot be corrected by use of ECC information may be corrected by parity substitution, which may comprise a) decoding ECC data stored on other elements 156A-N and/or the parity storage element 156Y, and b) recovering the unreadable data by use of parity substitution (e.g., using the decoded ECC data and/or parity data).

The storage layer 110 may maintain a front-end storage interface corresponding to the storage medium 150. As used herein, a "front-end storage interface" or "logical interface" refers to an interface and/or namespace through which clients 107 may access the storage services provided by the storage layer 110. In the FIG. 1A embodiment, the storage layer 110 maintains a logical address space 121 corresponding to the storage medium 150, by use of the translation module 120. The logical address space 121 may comprise a group, set, collection, range, and/or extent of identifiers. As used herein, an "identifier" or "logical identifier" (LID) refers to an identifier for referencing a storage and/or I/O resource; LIDs may include, but are not limited to: names (e.g., file names, distinguished names, and/or the like), data identifiers, references, links, front-end identifiers, logical addresses, logical block addresses (LBAs), storage unit addresses, virtual storage unit (VSU) addresses, logical unit number (LUN) addresses, virtual unit number (VUN) addresses, virtual logical unit number (vLUN) addresses, virtual storage addresses, storage addresses, physical addresses, media addresses, back-end addresses, unique identifiers, globally unique identifiers (GUIDs), and/or the like.

The logical capacity of the logical address space 121 may correspond to the extent, range, and/or number of LIDs in the logical address space 121 and/or the size and/or granularity of storage resources represented by the respective LIDs. The logical address space 121 maintained by translation module 120 may be independent of the underlying storage medium 150, such that any LID within the logical address space 121 can be mapped to any storage unit(s) 152 on the storage medium 150 (e.g., any particular storage unit 152, portion of a storage unit 152, and/or set of storage units 152). In some embodiments, the logical address space 121 may be "sparse," "thinly provisioned," and/or "over provisioned." As used herein, a thinly provisioned or over provisioned logical address space 121 refers to a logical address space 121 having a logical capacity that is independent of the physical storage capacity and/or granularity of the underlying storage resources (e.g., independent of the physical storage capacity and/or storage address space 151 of the storage medium 150). Accordingly, the logical address space 121 may be independent of the underlying storage resources, such that there are no set or predetermined mappings between the logical address space 121 and the storage address space 151. The logical address space 121 may be "sparse," such that physical storage resources corresponding to a particular LID of the logical address space 121 are not reserved and/or consumed until data is written to the particular LIDs. In one embodiment, the logical address space 121 comprises 64-bit LIDs (e.g., $2^{26}$ unique LIDs). The storage layer 110 may leverage the sparse, thinly provisioned logical address space 121 to efficiently allocate and/or reference contiguous ranges of LIDs and/or manage many-to-one mappings between LIDs and physical storage resources. The storage layer 110 may allocate logical capacity to clients 107 by, inter alia, allocating LIDs within the logical address space 121. Allocating a LID may comprise reserving a LID for use by a particular client 107. Reserving and/or allocating a LID may not result in reserving physical storage resources on the storage medium 150 until physical storage capacity is explicitly reserved and/or data is written to the LIDs.

The storage layer 110 may be further configured to maintain storage metadata 124, which may include, but is not limited to: a forward map 125 comprising any-to-any mappings between LIDs of the logical address space 121 and the storage address space 151, a reverse map or validity map 127 pertaining to the contents of particular storage units 152 and/or storage divisions 154, and/or profiling metadata 129 pertaining to wear level(s) of the storage divisions 154, storage division error rate, storage performance metrics (e.g., latencies of erase and/or write operations), and so on. Portions of the storage metadata 124 may be maintained within the volatile memory resources 103 of the computing system 100. Alternatively, or in addition, portions of the storage metadata 124 may be stored on non-volatile storage resources 104 and/or the storage medium 150.

The translation module 120 may be configured to associate, bind, map, tie, and/or assign LIDs of the logical address space 121 to data stored on the storage medium 150 by use of the storage metadata 124. As illustrated in FIG. 1B, the translation module 120 may be configured to map LIDs to particular storage units 152 by use of the forward map 125. The forward map 125 may comprise a translation layer between the logical address space 121 and the storage address space 151, wherein any LID is capable of being mapped to any storage unit 152 (and vice versa). In some embodiments, the forward map 125 may further include an intermediate mapping layer in which LIDs are mapped to intermediate addresses of an intermediate address space and/or virtual identifiers (VIDs) of a virtual address space, which are mapped to respective storage units 152.

The logical address space 121 may be independent of the storage address space 151 of the storage medium 150. As illustrated in FIG. 1B, the logical address space 121 may be sized differently than the underlying storage address space 151 (e.g., may represent a logical capacity that exceeds the physical storage capacity of the storage medium 150 and/or comprise a larger number of LIDs than available storage units 152). The translation module 120 may maintain and/or represent the forward map 125 using any suitable data structure, including, but not limited to: an index, a map, a hash map, a hash table, a tree, a range-encoded tree, a b-tree, a radix tree, a trie, a prefix tree, a compact prefix tree, and/or the like. The forward map 125 may comprise entries 126 corresponding to LIDs that are being used to reference data stored on the storage medium 150. The entries 126 of the forward map 125 may associate LIDs with respective storage addresses within the storage address space 151. The forward map 125 may be sparsely populated, and as such, may omit entries 126 corresponding to LIDs that are not currently in use to reference stored data, regardless of whether the LIDs have been allocated and/or reserved by a client 107. In some embodiments, the forward map 125 comprises one or more range-encoded entries 126 that correspond to a plurality of LIDs (e.g., a range, extent, and/or set of LIDs). In the FIG. 1B embodiment, the forward map 125 includes an entry 126 that maps a range of LIDs (LIDs 34-35) to a corresponding range of storage addresses (16987-16988). The entries 126 of the forward map 125 are indexed and/or referenced by LID (e.g., in a tree data structure). The disclosure is not limited in this regard, however, and could be adapted to use any suitable data structure and/or indexing mechanism.

In some embodiments, the storage metadata 124 may further comprise information to distinguish valid from invalid data stored on the storage medium 150. As used herein, "invalid" data refers to data that does not need to be retained on the storage medium 150. Invalid data may include, but is not limited to: data that was been overwritten out-of-place by other, more recent data (e.g., obsolete data); data that has been erased, deleted, cleared, removed, deallocated, unmapped, TRIMed, or the like; unused data; data evicted from a cache; and/or the like. The validity map 127 may comprise and/or reference respective validity bitmaps 128A-N pertaining to respective storage divisions 154A-N. The validity bitmaps 128A-N may identify valid and/or invalid data stored on the storage units 152 of the respective storage divisions 154A-N.

In some embodiments, the storage layer 110 may be configured to manage write-once, asymmetric properties of the storage medium 150 by use of the independent logical-to-physical translation layer maintained by the translation module 120. As disclosed herein, the logical-to-physical translation layer may comprise any-to-any mappings between the logical address space 121 and physical storage resources, such that a LID can map to any storage unit 152 on the storage medium 150. The logical-to-physical translation layer may be leveraged to implement storage operations "out-of-place," on the storage medium 150. As disclosed above, writing data "out-of-place" refers to updating and/or overwriting data stored on a particular storage unit by writing the data to an available, writable storage unit 152 rather than overwriting the data "in-place." Updating a particular storage unit 152 in-place may result in write amplification, since an in-place update may comprise: a) reading unmodified data from the storage division 154 comprising the particular storage unit 152, b) erasing the storage division 154, c) writing updated data to the particular storage unit 152, and c) rewriting unmodified data back to the storage division 154. Updating and/or overwriting data out-of-place may avoid write amplification since existing, valid data on the storage division 154 need not be immediately erased and rewritten. Moreover, writing data out-of-place may remove erasure from the latency path of many storage operations.

Figure 1D:
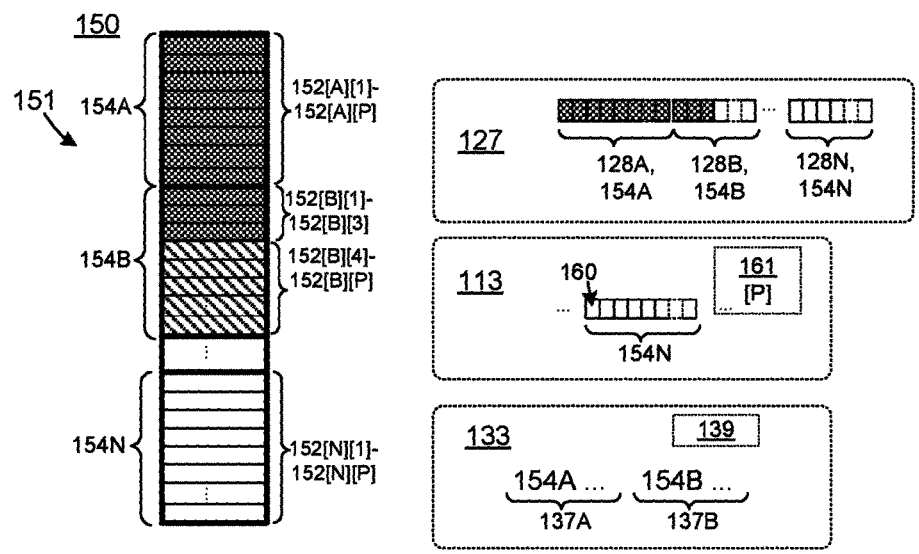
FIG. 1D depicts embodiments of a storage medium having an available write capacity, and comprising recoverable storage divisions.

Implementing storage operations out-of-place may result in: a) accumulation of invalid data on the storage medium 150, and/or b) consume an available write capacity on the storage medium 150. As disclosed above, "invalid data" refers to data that does not need to be retained on the storage medium 150. Invalid data may include, but is not limited to: data that has been overwritten and/or modified out-of-place (e.g., data that has been rendered obsolete, as disclosed above); data that has been erased, deleted, cleared, removed, deallocated, unmapped, TRIMed; unused data; data that has been evicted from a cache; cache data that is discardable (e.g., has been written back to primary storage); and/or the like. The "write capacity" available on the storage medium 150 refers to physical storage capacity of the storage units 152 that are in a writeable state. The available write capacity may differ from the physical storage capacity of the storage medium 150. FIG. 1D depicts one embodiment of a storage address space 151 of the storage medium 150. In the FIG. 1D embodiment, the storage medium 150 comprises storage divisions 154A-N, each of which comprise P storage units 152. Storage division 154A comprises storage units 152[A][1]-152[A][P], storage division 154B comprises storage units 152[B][1]-152[B][P], storage division 154N comprises storage units 154[N][1]-154[N][P], and so on. The storage units 152[N][1]-152[N][P] may be in a writable state, and the other storage units 152 of the storage medium 150 may be in an unwritable state. Accordingly, the available write capacity of the storage medium 150 corresponds to P storage units 152. The storage medium 150 comprises P+3 storage units 152 that are currently storing invalid data that does not need to be retained on the storage medium 150 (e.g., storage units 152[A][1]-152[A][P] and 152[B][1]-152[B][3] as indicated by the validity bitmaps 128A and 128B corresponding to storage divisions 154A and 154B in the validity metadata 127). The available or "free" physical storage capacity on the storage medium 150, therefore, corresponds to 2P+3 storage units 152 (the storage capacity of the P writable storage units 152 of storage division 154N and the P+3 storage units 152 currently storing invalid data). However, since storage units 152[A][1]-152[A][P] and 152[B][1]-152[B][3] are not writable, the full available storage capacity is not currently available for write operations; only the P storage units 152[N][1]-152[N][P] in storage division 154N are available as write capacity for servicing write operations.

The storage layer 110 may be configured to write data out-of-place to writable storage units 152 in response to incoming storage requests. The storage layer 110 may service the write requests by a) writing data to writable storage units 152[N][1]-152[N][P] and b) mapping LIDs associated with the data to the storage units 152 used to service the write requests, and so on. Servicing the write requests may consume the available write capacity of the storage medium 150 (e.g., fill storage units 152[N][1]-152[N][P]). Write operations may stall when the remaining write capacity is exhausted.

Referring back to FIG. 1A, the storage layer 110 may comprise a media manager 130 configured to, inter alia, manage the available write capacity on the storage medium 150. The media manager 130 may comprise an erase module 138 configured to transition storage divisions 154 to a writable state. The media manager 130 may further comprise an erase manager 136 configured to reduce the erase dwell time of the storage division 154 and/or prevent write stall conditions. As disclosed above, erase dwell time refers to the time during which storage units 152 are in an erased, writable state. The erase dwell time of a storage unit 152 may comprise the time span from erasure of the storage unit 152 until the time data is programmed to the storage unit 152.

The erase manager 136 may be configured to reduce the erase dwell time of storage units 152 by, inter alia, scheduling erase operations on storage divisions 154, such that the erase operations are completed at the time the storage divisions 154 are projected to be required for servicing storage operations. Referring back to FIG. 1D, the erase manager 136 may be configured to perform an erase operation on storage division 154A to increase the available write capacity on the storage medium 150. In one embodiment, the erase operation may be implemented in response to selecting the storage division 154A for recovery (based on the amount of invalid data in the storage division 154A) and/or in response to determining that the storage division 154A is prepared for erasure. As used herein, a storage division 154 that is prepared for erasure may refer to a storage division that does not comprise data that needs to be retained on the storage medium 150 (e.g., a storage division 154 comprising invalid data and/or a storage division 154 from which valid data has been relocated). Erasing the storage division 154A in response to selection and/or determining that the storage division 154A is prepared for erasure may, however, result in increased erase dwell time for the storage division 154A. The storage division 154A may be held in an erased state, while write operations are completed on other writabe storage divisions 152 on the storage medium 150 (e.g., storage divisions 152[N][1]-152[N][P].

In some embodiments, the erase manager 136 is configured to adapt erase operations such that erase operation complete as the remaining write capacity on the storage medium 150 is consumed. In the FIG. 1D embodiment, the erase manager 136 may adapt the erase operation on storage division 154A, such that storage division 154A transitions to a writable state at the time that the remaining write capacity of storage division 154N is filled. The erase manager 136 may configure the erase module 138 to initiate an erase operation on the storage division 154A in response to filling a particular portion of storage division 154N (T_FillRatio), in response to filling a threshold number of storage units 152 of the storage division 154N (T_Filled), in response to determining that a threshold number of writable storage units 152 are available in the storage division 154N (T_Remain), and/or the like.

In some embodiments, the fill threshold(s) disclosed herein may be based on a projected erase time for the storage division 154A-N to be reinitialized (e.g., $\Delta T\_Erase$ of storage division 154A) and/or the projected write and/or fill time for the storage division 154A-N currently being used to service write requests (e.g., $\Delta T\_Write$ of storage divisions 154N). The fill ratio threshold T_Ratio may be calculated as $1-(\Delta T\_Erase/\Delta T\_Write)$, such that the erase manager 136 configures the erase module 138 to initiate erase of the storage division 154A when $1-(\Delta T\_Erase/\Delta T\_Write)$ of the write capacity within the storage division 154N has been filled. Other thresholds T_Filled and/or T_Remain may be derived by use of $\Delta T\_Erase$, $\Delta T\_Write$, and/or metadata pertaining to the number of available storage units 152 within the storage division(s) 154A-N. The T_Filled threshold may be derived from T_Ratio by scaling T_Ratio by the number of storage units 152 in storage division 154N.

In some embodiments, the $\Delta T\_Erase$ and $\Delta T\_Write$ may comprise fixed values corresponding to particular types of storage media, testing, experience, specifications, and/or the like. The projected erase time $\Delta T\_Erase$ may correspond to measured, observed, and/or specified latencies for erase operations on the storage divisions 154A-N of the storage medium 150. In some embodiments, the erase latency values ($\Delta T\_Erase$) are projected to be the same across the storage divisions 154A-N and/or constant over the life of the storage medium 150. Alternatively, the erase manager 136 may adapt the $\Delta T\_Erase$ values based on profiling metadata 129 pertaining to particular storage divisions 154A-N, groups of storage divisions 154A-N, and/or usage conditions on the storage medium 150, such as the wear level(s) of the storage divisions 154A-N, past performance, and so on. In some embodiments, the projected erase latency $\Delta T\_Erase$ increases as a function of wear on the storage divisions 154A-N (e.g., may increase as a function of program erase count). The erase manager 136 may determine the projected erase latency $\Delta T\_Erase$ of storage divisions 154A-N based on monitored erase performance (e.g., latency of erase operations previously implemented on the particular storage division 154A-N and/or on other storage divisions 154A-N). Performance characteristics of erase operations performed on the storage divisions 154A-N may be monitored by the media controller 116 and/or recorded in the profiling metadata 129 maintained by the storage layer 110, as disclosed herein. The erase manager 136 may use the profiling metadata 129 to determine a projected erase latency for particular storage divisions 154A-N.

The projected $\Delta T\_Write$ latency to fill a storage division 154A-N may be a fixed value corresponding to measured, observed, and/or specified latencies for program and/or write operations on the storage medium 150. In one embodiment, the projected write time ($\Delta T\_Write$) of a storage division 154A-N may be projected based on the storage capacity of the storage division 154A-N and/or the maximum write rate to the storage division 154A-N (e.g., the fill time for a storage division 154A-N having a storage capacity of X MB and a maximum fill rate of Y MB/second may be X/Y seconds). In some embodiments, the $\Delta T\_Write$ values are projected to be the same across the storage divisions 154A-N. Alternatively, the $\Delta T\_Write$ values may be adapted according to profiling metadata 129 pertaining to particular storage divisions 154A-N and/or groups of storage divisions 154A-N. In some embodiments, the projected $\Delta T\_Write$ latency may be a function of operating conditions of the storage medium, such as wear level (e.g., the $\Delta T\_Write$ may increase as a function of media wear). In some embodiments, $\Delta T\_Write$ may be based on performance of previous write operations on the particular storage division 154A-N and/or other storage divisions 154A-N. The performance characteristics of write operations may be monitored by the media controller 116 and/or recorded in the profiling metadata 129, as disclosed herein.

In some embodiments, the erase manager 136 is further configured to adapt erase operations in accordance with operating conditions, such as a projected write load. As used herein, the "write load" on the storage medium 150 refers to the rate of incoming write requests to the storage layer 110 and/or the amount of data to be written in response to the write requests (e.g., MB per second projected to be written to the storage medium 150). The write rate may, therefore, affect the rate at which the write capacity of the storage medium 150 is consumed. As disclosed above, the projected write time ($\Delta T\_Write$) used to derive T_Ratio, T_Filled, and/or T_Remain thresholds may correspond to the projected time to fill a particular amount of write capacity under a full write load (e.g., minimum fill time assuming a full write load). If, however, the rate of write requests does not constitute a full write load, write operations on the storage medium 150 may stall waiting for incoming write requests and the write capacity of the storage medium 150 may be consumed at a lower rate than a maximum fill rate (e.g., the actual $\Delta T\_Write$ may be significantly longer due to lower write rate). Accordingly, in some embodiments, the erase manager 136 may be configured to adapt the threshold(s) disclosed herein in accordance with a projected rate of write operations. In one embodiment, the erase manager 136 may be configured to increase the projected write time ($\Delta T\_Write$) used to derive the threshold(s), disclosed above. Alternatively, the erase manager 136 may adapt the corresponding thresholds T_Ratio, T_Filled, and/or T_Remain based on projected write rate (e.g., increase the T_Ratio and/or T_Filled thresholds in response to a low projected write rate and/or decrease the T_Remain threshold). Although particular mechanisms for determining threshold values pertaining to erase operations are disclosed herein, the disclosure is not limited in this regard, and could be adapted to use threshold values T_Ratio, T_Filled, and/or T_Remain derived using any suitable mechanism (e.g., and/or user-defined threshold values).

The erase manager 136 may be configured to determine a write load projection by, inter alia, monitoring write requests received through the interface 111, recording profiling metadata 129 pertaining to the rate of write requests at particular times, and so on. The erase manager 136 may be configured to determine a write rate projection by filtering a history of incoming write requests recorded in the profiling metadata 129 in the time domain (e.g., using an exponential infinite impulse response (IIR) filter), and/or the like. Alternatively, or in addition, the erase manager 136 may utilize user-defined write rate projection(s).

In some embodiments, the erase manager 136 may be further configured to adapt erase operations in accordance with user-defined preferences. The user-defined preferences may specify whether to optimize the media management for write performance (e.g., to avoid write stall conditions), to optimize for media endurance (e.g., minimize erase dwell time), and/or the like. Optimizing write performance may comprise reducing the T_Ratio and/or T_Filled thresholds (and/or increasing the T_Remain threshold) used to initiate erase operations on the storage divisions 154A-N (e.g., by scaling one or more of $\Delta T\_Write$ and/or $\Delta T\_Erase$ used to calculate the thresholds, and/or the like). Reducing the T_Ratio and/or T_Filled thresholds (and/or increasing the T_Remain threshold) may result in erasing storage divisions 154A-N sooner than the storage divisions 154A-N are projected to be needed to service write requests, which may increase the erase dwell time of the storage divisions 154A-N, but reduce the likelihood and/or frequency of write stall conditions. In another embodiment, user-defined preferences may optimize for media endurance, which may comprise increasing T_Ratio and/or T_Filled (and/or decreasing T_Remain), resulting in further delays to the erase operations, which may minimize erase dwell time, but increase the likelihood and/or frequency of write stall conditions.

As disclosed above, in the FIG. 1D embodiment, the storage manager 112 may be preparing to write data to storage division 154N (the storage division 154N and the storage units 152[N][1]-152[N][P] thereof may be in a writable state). Accordingly, the storage division 154N may be designated as the "current" or "active" storage division 154A-N being used to service write requests.

Referring back to FIG. 1A, the storage layer 110 may comprise a garbage collector 132 configured to reclaim storage resources on the storage medium 150. The garbage collector 132 may comprise a selector module 134 configured to select storage divisions 154A-N for garbage collection (e.g., transition the storage division 154A-N from an unwritable state to a writable state). A garbage collection operation may comprise: a) selecting a storage division 154A-N to reclaim, by use of the selector module 134), b) preparing the selected storage division 154A-N to be reset, and c) resetting the selected storage division 154A-N to a writable state (e.g., erasing the selected storage division 154A-N by use of the erase manager 136 and/or erase module 138 as disclosed herein). Preparing the selected storage division 154A-N to be reset may comprise relocating valid data stored on the selected storage division 154A-N (if any) to one or more other storage divisions 154A-N. Alternatively, preparing the selected storage division to be reset may comprise determining that the selected storage division 154A-N does not comprise data that needs to be retained on the storage medium 150 (as in FIG. 1D, where the storage division 154A exclusively comprises invalid data).

As disclosed herein, the selector module 134 may be configured to select a storage division 154A-N for recovery by use of one or more selection metrics and/or criteria, which may include a primary selection metric and/or an alternative selection metric. The primary selection metric may comprise a "free space" or "invalid data" metric. The "free space" metric of a storage division may quantify the amount of storage capacity freed by recovering the respective storage divisions 154A-N (e.g., the free space metric of a storage division 154A-N having 90% of its physical storage capacity in use to store invalid data may be expressed as a percentage, a ratio, 0.9*SD_Capacity, where SD_Capacity is the physical storage capacity of the storage division, and/or the like). The "invalid data" metric may quantify the amount of invalid data stored within a storage division (e.g., 90% invalid). The metrics disclosed herein may be expressed in terms of percentages, ratios, physical storage capacity, and/or any other suitable mechanism.

The selector module 134 may use the free space and/or invalid data selection metric to identify and/or select storage divisions 154A-N comprising relatively larger amounts of invalid data for garbage collection. In some embodiments, recovering a storage division 154A-N having a large amount of invalid data is preferred since garbage collection operations on such storage divisions 154A-N result in: a) lower write amplification (less valid data to relocate from the selected storage division 154A-N); and b) increased available storage capacity. By contrast, recovering a storage division 154A-N comprising larger amounts of valid data may result in: a) increased write amplification (larger amount of valid data that must be rewritten to the storage medium 150), and b) freeing a smaller amount of storage capacity.

As disclosed herein, the storage medium 150 may have a limited usable life, which may be quantified in terms of the number of program and/or erase cycles that the storage divisions 154A-N are projected to be capable of enduring before becoming unusable. The storage layer 110 may be configured to manage wear levels of the storage divisions so that the storage divisions 154A-N wear evenly (e.g., prevent particular storage divisions 154A-N from being used more heavily than other storage divisions 154A-N, which may result in exhausting the usable life of the particular storage divisions prematurely). Accordingly, as used herein, "wear leveling" refers to managing wear conditions on the storage medium, such that wear is distributed evenly throughout the storage address space 151 of the storage medium 150 (e.g., distributed evenly across storage divisions 154A-N and/or the storage units 152 thereof). As used herein, a "wear condition" or "wear event" refers to any operation that consumes the usable life of a portion of the storage medium 150, which may include, but are not limited to: program and/or write cycles, read operations, erase operations, reset operations, initialization operations, PE cycles, erase dwell, and/or the like. The media controller 116 may be configured to monitor wear conditions and/or wear events on the storage divisions 154A-N, and to record metadata pertaining to the wear levels and/or remaining life of the storage divisions 154A-N in the profiling metadata 129. In some embodiments, the profiling metadata 129 comprises metadata pertaining to the program erase count, erase dwell time, data retention time, error rate, write latency, and/or erase latency of the storage divisions 154A-N.

The amount of wear on a storage division 154A-N may be quantified by use of a wear metric, which may correspond to one or more of: program and/or write cycle count, read operation count, erase cycle count, reset cycle count, initialization cycle count, PE cycle count, erase dwell time, error rate, and/or the like. In some embodiments, storage divisions 154A-N may be retired in response to the wear metric of the storage division exceeding a threshold. A remaining life metric may quantify the amount of remaining life of a storage division 154A-N, and may correspond to one or more of: remaining number of PE cycles the storage division is projected to be capable of enduring, projected error rate, and so on. The remaining life metric of a storage division may be related to the wear metric of the storage division 154A-N (e.g., the remaining life metric of the storage division may be inversely proportional to the wear metric of the storage division). The wear and/or remaining life metric of a storage division 154A-N may be determined by use of profiling information gathered and/or recorded in the profiling metadata 129 maintained by the storage layer 110, as disclosed herein.

In one embodiment, the selector module 134 is configured to adapt the primary selection metric and/or criterion to distribute wear across the storage divisions 154A-N of the storage medium 150, while reducing write amplification. In one embodiment, the selector module modifies the invalid data metric to calculate a granular invalid data metric (e.g., granularize and/or quantize the amount of invalid data in the storage divisions 154A-N). As used herein, a "granular invalid data metric" refers to a metric that quantifies the amount of invalid data in a storage division in terms of "granules" and/or "recovery blocks" (RB), which may represent a different quantum of storage capacity than the underlying block size of the storage divisions 154A-N (e.g., may differ from the physical storage capacity of the storage units within the storage division, storage block size, packet size, and/or the like). Calculating a "granular invalid data metric" of a storage division 154A-N may, therefore, comprise mapping the amount of invalid data stored within the storage division to a different, discrete set of RB, which may correspond to a particular percentage of the full storage division capacity. In one embodiment, a storage division may comprise 1 K storage units, each having an 8 K physical storage capacity (e.g., the storage division 154A-N may have a physical storage capacity of 8 MB). Accordingly, the "raw" or "full-resolution" invalid data metric for the storage division may be defined in terms of the 8 K blocks. The RB may be defined in terms of 64 K blocks. Therefore, the granular invalid data metric for a storage division in which 896 of the 8 K storage units comprise invalid data may be calculated as 112 recovery blocks (7168 K of invalid data quantized to 64 K RBs). Invalid data values that do not map directly within a discrete RB may be rounded up or down according to a quantization policy of the selector module 134. Although particular embodiments of granular metrics are described herein, the disclosure is not limited in this regard, and could be adapted to determine granular metrics using any suitable quantization, granularization, and/or data mapping technique.

The selector module 134 may select storage divisions 154A-N for recovery by use of the granular invalid data metrics, disclosed above. In accordance with the primary, greedy algorithm, the selector module may select storage divisions 154A-N having higher granular invalid data metrics over storage divisions having lower granular invalid data metrics. The granular invalid data metrics disclosed herein may have a lower resolution than the full-resolution, or raw invalid data metrics of the storage divisions 154A-N (e.g., the invalid data metrics of the storage divisions 154A-N may be defined in terms of 8 K blocks, whereas the granular invalid data metrics are defined in terms of larger, 64 K RB). Accordingly, storage divisions having similar, but not equal, amounts of invalid data may correspond to the same quantized invalid data metric. In some embodiments, the selector module is configured to apply a secondary selection metric to select between two or more storage divisions having the same quantized invalid data metrics (and/or quantized invalid data metrics within a threshold). The secondary selection metric may be configured to wear level the storage medium 150 and, as such, may correspond to wear metrics of the two or more storage divisions 154A-N (e.g., may select the storage division having the lower wear level and/or greater remaining life metric). In one embodiment, two storage divisions 154A-N may comprise similar amounts of invalid data (e.g., 96.7% in storage division 154J and 97.1% in storage division 154K). The granular invalidity metrics of the storage divisions 154J and 154K may be the same. Therefore, in accordance with the secondary selection metric, the selector module 134 may select the storage division 154J or storage division 154K having the lowest wear metric (e.g., fewest number of PE cycles) for garbage collection. The storage division 154J may have a lower wear metric than the storage division 154K and, as such, may be selected for garbage collection even through the raw invalid data metric of the storage division 154J is less optimal than storage division 154K (96.7% invalid versus 97.1% invalid). Alternatively, or in addition, the secondary selection metric may correspond to data retention time, such that the storage division 154J or 154K with the longest time data retention is selected for recovery. As used herein, the "data retention time" of a storage division refers to the length of time data has remained on the storage division. The data retention time of a storage division may refer to the time that has elapsed since the storage division was closed (e.g., since the storage units thereof were programmed). Alternatively, the data retention time may be defined as the time elapsed since the storage division was initialized and/or since data was first programmed to the storage division after initialization (e.g., time elapsed since the storage division was erased, reset, recovered, cleared, and/or the like).

In some embodiments, the selector module is further configured to implement an adaptive comparison of invalid data metrics pertaining to the storage units (either the raw invalid data metric and/or the granular invalid data metrics). As used herein, an adaptive comparison refers to a comparison and/or selection criterion that is a function of the relative amounts of invalid data within the storage divisions. In an adaptive comparison, the selector module 134 may be configured to adjust the resolution and/or weight of differences in invalid data metrics in accordance with the relative amount of invalid data within the storage divisions 154A-N. In one embodiment, the adaptive comparison is configured to reduce the weight of differences in the invalid data metrics when comparing storage divisions 154A-N comprising relatively large amounts of invalid data (since small differences in the overall amount of invalid data in the respective storage divisions 154A-N are unlikely to significantly affect write amplification). By contrast, differences in the invalid data metrics in comparisons between storage divisions 154A-N comprising smaller amounts of invalid data may be weighted more heavily (since recovery of such storage divisions is likely to create significantly more write amplification). In one embodiment, the adaptive comparison implemented by the selector module 134 comprises a logarithmic comparison of the invalid data metrics of the storage divisions (e.g., the approximate base 2 log of the raw and/or granular invalid data metrics of the storage divisions 154A-N) and/or may comprise deriving adaptive invalid data metrics corresponding to the storage divisions 154A-N. Storage divisions 154A-N having similar adaptive invalid data metrics (and/or within a threshold) may be distinguished by use of a secondary selection metric, as disclosed above (e.g., based on wear metric, data retention time, and/or the like). Although particular embodiments of adaptive metrics and/or comparisons are described herein, the disclosure is not limited in this regard and could be adapted to implement an adaptive comparison of invalid data metrics (raw and/or granular) using any suitable technique.

In some embodiments, the selector module 134 is further configured to override the primary selection metric and/or criterion with an alternative selection metric and/or criterion. The alternative selection metric may be adapted to wear level the storage medium 150, such that storage divisions 154A-N having lower levels of wear are selected for garbage collection over storage divisions 154A-N having higher levels of wear, despite differences in the amount of invalid data on the respective storage divisions 154A-N. The alternative selection metric may prevent storage divisions 154A-N comprising "cold" and/or write-once-read-many (WORM) data from disuse and/or avoid concentration of PE cycles in certain storage divisions 154A-N. Overriding the primary selection metric may comprise selecting a storage division 154A-N to recover based on wear and/or remaining life metrics of the storage divisions 154A-N as opposed to the invalid data metrics disclosed above. Storage divisions selected using a wear level selection metric may result in increased write amplification (and/or free less storage capacity than a recovery operation on a storage division comprising a larger amount of invalid data). Accordingly, the selector module 134 may limit overrides of the primary selection metric. The selector module 134 may be configured to override the primary selection metric with the alternative selection metric in response to wear level conditions on the storage medium 150. In one embodiment, the selector module is configured to override the primary selection metric in response to determining that the wear is not being evenly distributed among the storage divisions 154A-N (e.g., based on differences in wear metrics between the storage divisions 154A-N). In one embodiment, the selector module 134 is configured to override the primary selection metric in response to a difference between the wear level and/or remaining life metric of one or more storage divisions 154A-N exceeding a threshold. Alternatively, or in addition, the selector module 134 may be configured to override the primary selection metric in response to a variance and/or deviation in the wear metrics of the storage divisions 154A-N exceeding a threshold. In some embodiments, the selector module may further limit overrides of the primary selection metric to a particular period and/or frequency (e.g., an override per N selections using the primary selection metric).

The selector module 134 may be configured to select storage divisions for garbage collection and/or recovery in response to particular conditions, such as the availability of write capacity on the storage medium 150. As disclosed above, the write capacity on the storage medium 150 refers to the availability of writable storage units 152 and/or storage divisions 154A-N. The storage manager 112 may be configured to service write requests by, inter alia, writing data to writable storage units 152, thereby consuming the write capacity on the storage medium 150. In one embodiment, the storage manager 112 comprises write capacity metadata 113, which may comprise a write capacity queue. The write capacity queue may track and/or identify writable storage resources on the storage medium 150 (e.g., available write capacity). In the FIG. 1D embodiment, the write capacity metadata 113 indicates that the storage units 152 of storage division 154N are available to service write requests (e.g., are writable). The write capacity metadata 113 may further include other storage divisions 154A-N and/or storage units 152 that are in a writable state (not shown). The write capacity metadata 113 may comprise a pointer 160 to the storage address that is currently in use for servicing write requests. The pointer 160 may reference a storage unit 152 that will be used to service the next write request received at the storage layer 110. The pointer 160 may constitute a current append point within the storage address space 151. The storage manager 112 may be further configured to determine and/or track available write capacity metadata 161 that indicates the remaining available write capacity on the storage medium 150. In the FIG. 1D embodiment, the available write capacity metadata 161 may indicate that the storage medium 150 comprises P storage units 152 of write capacity.

In some embodiments, the storage manager 112 is configured to fill storage divisions 154A-N according to a particular fill pattern (e.g., sequentially within the storage address space 151 of the respective storage divisions 154A-N). Accordingly, the storage manager 112 may service a next write request by writing data to storage unit 152[N][1] and, in response, may increment the pointer 160 to storage unit 152[N][2], and so on. After filling a storage division 154A-N, the storage manager 112 may begin writing to another writable storage division 154A-N (if available). If no writable storage units 152 are available, the storage manager 112 may stall write operations until additional write capacity is reclaimed, as disclosed herein. Although in FIG. 1A the write capacity queue is depicted as an element of the storage manager 112, the disclosure is not limited in this regard, and may be adapted to maintain the write capacity metadata 113 with other storage metadata 124, such as the forward map 125, validity map 127, profiling metadata 129, and/or the like.

As disclosed above, the selector module 134 is configured to identify storage divisions 154A-N for garbage collection using, inter alia, a primary selection metric and/or criterion, an alternative selection metric and/or criterion, and/or one or more secondary selection metrics and/or criteria. The selector module 134 may maintain metadata pertaining to storage divisions that are suitable for garbage collection by use of garbage collection metadata 133, which may be maintained by the storage layer 110 with the storage metadata 124, as disclosed herein. Referring to FIG. 1D, the garbage collection metadata 133 may include a primary selection queue 137A that identifies storage divisions 154A-N selected for storage recovery by use of a primary selection metric and/or criterion. As disclosed herein, the primary selection metric may correspond to a greedy selection metric based on one or more of: an invalid data metric (e.g., amount of invalid data stored within the respective storage divisions 154A-N), a granular invalid data metric, an adaptive invalid data metric (e.g., adaptive and/or logarithmic invalid data metric), and/or the like. In the FIG. 1D embodiment, the storage division 154A may correspond to the highest invalid data metric and, as such, is in the primary selection queue 137A. Other storage divisions 154A-N comprising similar and/or equivalent invalid data metrics may be included in the primary selection queue 137A. In some embodiments, the primary selection queue 137A comprises a list of storage divisions 154A-N ordered by respective invalid data metrics thereof. Alternatively, or in addition, the primary selection queue 137A may comprise a plurality of regions and/or classifications comprising storage divisions 154A-N having similar and/or equivalent invalid data metrics (e.g., storage divisions having raw, granular, and/or adaptive invalid data metrics that differ by less than a threshold). As disclosed herein, the selector module 134 may select storage divisions 154A-N form the respective regions and/or classifications based on one or more secondary selection metrics (e.g., wear metric and/or data retention time).

In some embodiments, the garbage collection metadata 133 further includes an alternative queue 137B that identifies storage divisions 154A-N for garbage collection selected by use of an alternative selection metric and/or criterion (e.g., wear and/or remaining life metric). The alternative queue 137B may, therefore, comprise storage divisions 154A-N having lower wear metrics than other storage divisions 154A-N. In the FIG. 1D embodiment, the storage division 154B may have lower than normal wear and, as such, is selected for inclusion in the alternative queue 137B. The garbage collection metadata 133 may further include and/or reference wear level metadata pertaining to the storage divisions 154A-N. The wear level metadata 139 may be maintained in the profiling metadata 129, as disclosed above. The wear level metadata may indicate the relative wear metrics of the storage divisions 154A-N, including differences between wear levels of the storage divisions 154A-N. The selector module 134 may access the wear level metadata 139 to determine whether to override the primary selection metric with the alternative selection metric. In the FIG. 1D embodiment, overriding the primary selection metric may comprise selecting storage division 154B from the alternative queue 137B for a garbage collection operation rather than storage division 154A in the primary queue 137A.

As disclosed above, the selector module 134 may be configured to determine whether to override the primary selection metric in response to a difference in wear metrics between two or more storage divisions 154A-N exceeding a threshold. In one embodiment, the difference in wear metric may be quantified as a difference in erase count. The selector module 134 may override the primary selection metric in response to a difference between the highest PE count (PE_High) and a low PE count (PE_Low) exceeding a difference threshold (T_PECount), such that PE_High−PE_Low≥T_PECount. In another embodiment, the selector module 134 may be configured to override the primary selection metric in response to a difference between a PE count of a particular storage division (e.g., the PE count of storage division 154B, PE_CountB) and an average PE count of the storage divisions 154A-N (PE_Ave) exceeds a threshold (T_PEAve), such that |PE_Ave−PE_CountB|≥T_PEAve. In another embodiment, the selector module 134 may maintain a mathematical model of the distribution of wear metrics (e.g., a normal or Gaussian distribution). The selector module 134 may override the primary selection metric in response to a variance and/or deviation of the model exceeding a threshold. Although particular metrics and/or criteria for overriding the primary selection metric are described herein, the disclosure is not limited in this regard, and could be adapted to determine whether to override the primary selection metric with a wear-based metric by use of any suitable metric and/or criterion. Moreover, although the specific examples disclosed herein pertain to PE count, the disclosure is not limited in this regard and may be adapted to quantify wear metric and/or differences in wear metrics using any suitable measure of media wear, including, but not limited to: erase dwell time, error rate, projected error rate, and/or the like.

As disclosed above, a garbage collection operation may comprise a) preparing a selected storage division 154A-N to be erased and/or b) erasing the selected storage division 154A-N by use of the erase manager 136 and/or erase module 138. Preparing the selected storage division 154A-N to be erased may comprise determining that data stored on the storage division 154A does not need to be retained on the storage medium 150 (e.g., the data is invalid).

Figure 1E:
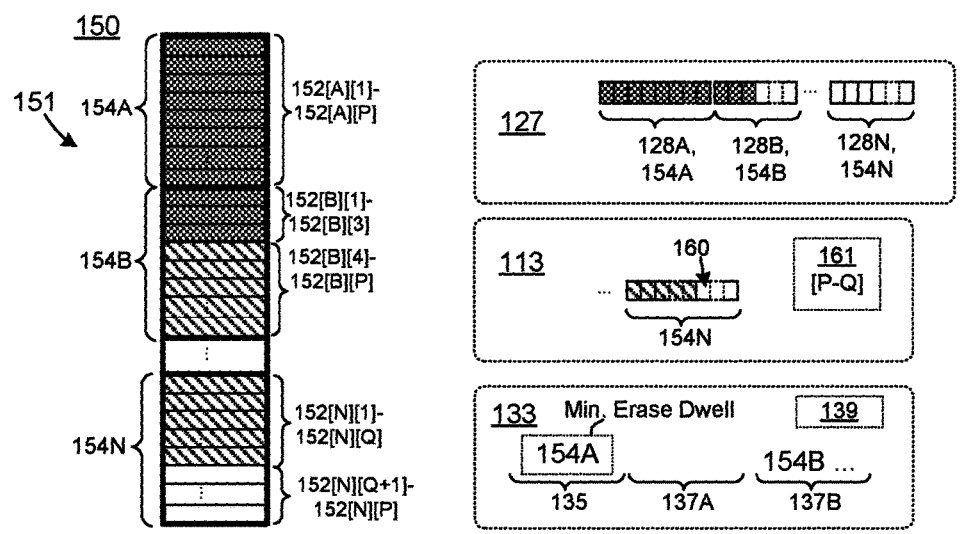
FIG. 1E depicts embodiments of operations for reducing the erase dwell time of a storage medium.

FIG. 1E depicts embodiments for minimizing erase dwell of a storage medium 150. In the FIG. 1E embodiment, the storage division 154A is selected for recovery. In the FIG. 1E embodiment, the garbage collection metadata 133 comprises a reset queue 135 that identifies storage divisions 154A-N that are prepared to be reset (e.g., erased to a writable state). As disclosed herein, a storage division 154A-N is prepared to be reset in response to determining that the storage division does not comprise data to retain on the storage medium 150. The storage division 154A does not comprise data to retain on the storage medium 150 and, as such, may be included in the reset queue 135. Although not depicted in FIG. 1E, one or more other storage divisions 154A-N may be included in the primary selection queue 137A based on, inter alia, invalidity metrics of the storage divisions 154A-N, as disclosed herein.

The erase manager 136 may be configured to transition the storage division 154A to a writable state, such that the erase dwell time of the storage division 154A is minimized. The erase manager 136 may configure the erase operation on the storage division 154A, such that the erase operation is projected to complete at the time the storage division 154A will be needed to service write requests. The erase manager 136 may delay the erase operation in response to selection of the storage division 154A for garbage collection and/or in response to determining that the storage division 154A is prepared to be erased (e.g., in response to placing the storage division 154A in the reset queue 135).

As disclosed above, the erase manager 136 may be configured to delay the erase operation until a threshold ratio of the write capacity of storage division 154N is consumed (T_Ratio), until a threshold number of storage units 152 of the storage division 154N are filled (T_Filled), and/or the remaining write capacity of the storage division 154N (and/or other writable storage divisions 154A-N) falls below a threshold (T_Remain). The delay period may be based on the projected write time to the current storage division (storage division 154N), which may include write latency of the storage division 154N and/or a projected rate of write operations performed on the storage division 154N and/or a projected erase latency of the storage division 154A. In the FIG. 1E embodiment, the erase manager 136 is configured to initiate the erase operation on the storage division 154A in response to filling Q storage units 152 of the storage division 154N (the T_Filled threshold may be Q storage units, which may be determined as disclosed herein). As illustrated in FIG. 1E, write capacity metadata 113 indicates that the pointer 160 has advanced within the storage address space 151 of the storage division 154N, and the write capacity metadata 161 indicates that the remaining write capacity on the storage medium comprises P-Q storage units 152. As further illustrated in FIG. 1E, the storage division 154A is being held in a non-erased state, such that the erase operation on the storage division 154A has been delayed and/or deferred by the erase manager 136 in order to, inter alia, reduce the erase dwell time of the storage division 154A. In response to the write capacity metadata 113 depicted in FIG. 1E, the erase manager 136 may initiate an erase operation on the storage division 154A.

Figure 1F:
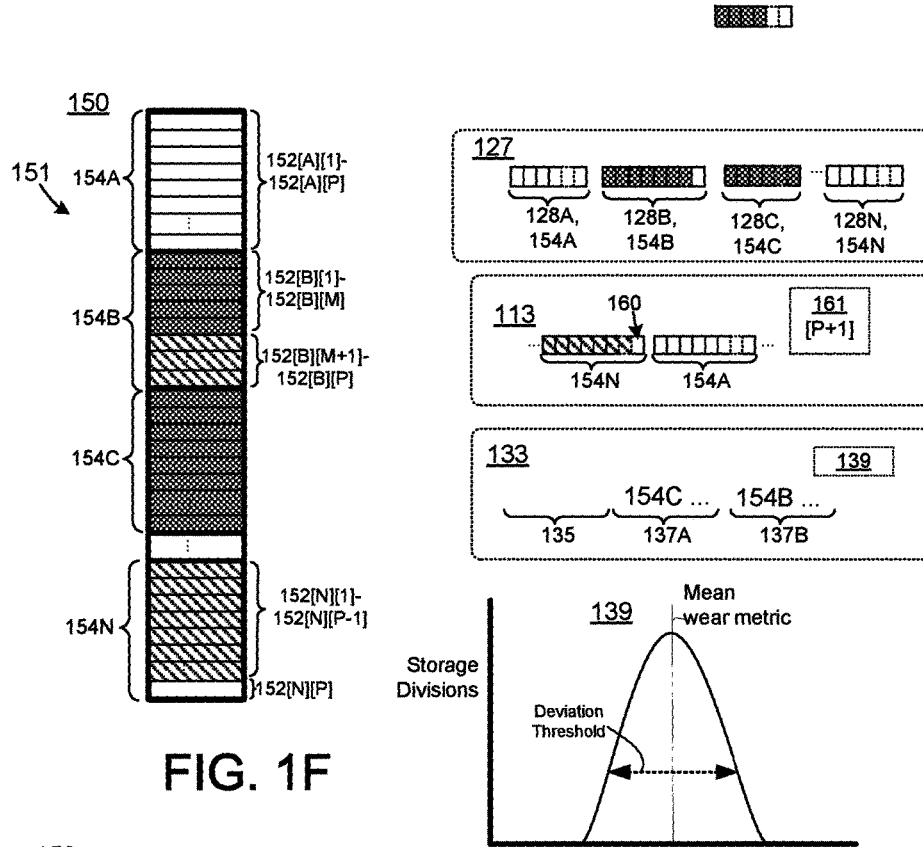
FIG. 1F depicts one embodiment for storage division selection.

FIG. 1F depicts one embodiment of a storage recovery operation on a storage medium 150. FIG. 1F depicts a recovery operation on the storage division 154A. The recovery operation may comprise erasing the storage division 154A. The erase operation may have a latency ($\Delta T\_Erase$). As illustrated in FIG. 1F, during the erase operation on storage division 154A, the storage manager 112 may continue to service storage requests by, inter alia, writing data to the storage division 154N. The storage manager 112 may have filled P-1 storage units 152 within the storage division 154N, such that a single writable storage unit 152[N][P] remains. The pointer 160 of the write capacity metadata 113 may, therefore, reference storage unit 152[N][P].

The erase operation on storage division 154A may have generated additional write capacity (e.g., P storage units 152[A][1]-152[A][P]). Accordingly, the write capacity metadata 161 may indicate an available write capacity of P+1 storage units 152. The write capacity metadata 113 (in a write capacity queue) may include the storage division 154A, such that, after writing data to the storage unit 152[N][P], the pointer 160 may advance to storage unit 152[A][1], or other writable storage unit 152 within storage division 154A.

As shown in FIG. 1F, data stored in the storage division 154B may have been invalidated during the erase operation on storage division 154A. The data may have been invalidated due to being overwritten and/or updated out-of-place (e.g., on storage division 154N), being deleted, erased, TRIMed, and/or the like. Accordingly, the storage units 152[B][1]-152[B][M] comprise invalid data, and the storage units 152[B][M+1]-152[B][P] comprise valid data. FIG. 1F further illustrates storage division 154C, which may be filled with invalid data (as indicated by the validity bitmap 128C).

The selector module 134 may select another storage division 154A-N for recovery based on one or more of the primary selection metric and/or alternative selection metric, disclosed herein. In the FIG. 1F embodiment, the primary selection queue 137A comprises, inter alia, storage division 154C, and the alternative selection queue 137B comprises storage division 154B. The selector module 134 may determine which selection metric to use in selecting a next storage division 154A-N to recover based on the wear metadata 139. As disclosed above, the selector module 134 may override the primary selection metric with the alternative selection metric in response to wear level conditions on the storage medium (e.g., variance wear metrics of the storage divisions 154A-N). In the FIG. 1F embodiment, the selector module 134 is configured to model a distribution of wear metrics of the storage division 154A-N by use of a distribution model (e.g., normal distribution). The selector module 134 may be configured to override the primary selection metric in response to a deviation of the model exceeding a deviation threshold. Alternatively, the selector module may be configured to override the storage medium in response to a difference between wear metrics of one or more of the storage divisions 154A-N exceeding a threshold, a variance exceeding a threshold, and/or the like, as disclosed above. In the FIG. 1F embodiment, the selector module 134 may determine that the wear distribution exceeds the deviation threshold and, as such, may override the primary selection metric with the alternative selection metric.

Overriding the primary selection metric may comprise selecting the storage division 154B from the alternative queue 137B rather than storage division 154C in the primary queue 137A. In response to selecting the storage division 154B for garbage collection, the erase manager 136 may prepare the storage division 154B to be erased, which may comprise relocating valid data from the storage division 154B (if any) to one or more other storage divisions 154A-N. In the FIG. 1F embodiment, the storage division 154B may be prepared for recovery by, inter alia, rewriting the data stored in storage units 152[B][M+1]-152[B][P].

Figure 1G:
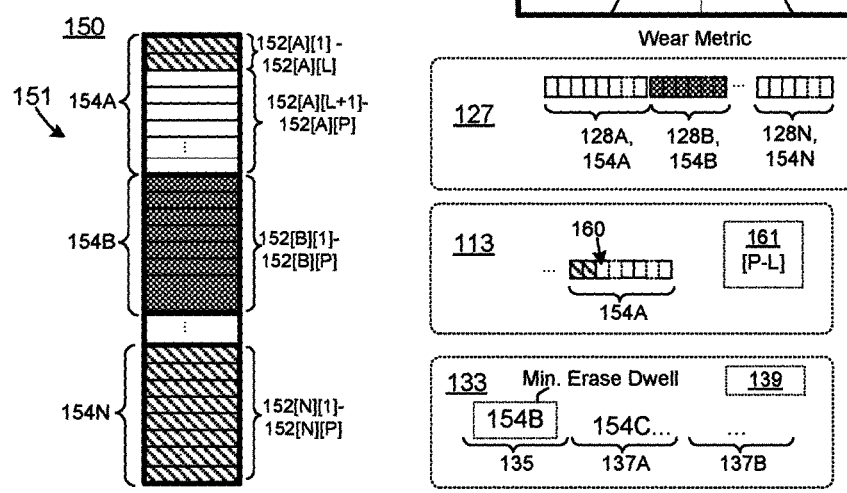
FIG. 1G depicts further embodiments of operations for reducing the erase well time of a storage medium.

FIG. 1G depicts operations to prepare the storage division 154B to be reset to a writable state. The storage division 154C is omitted from FIG. 1G to avoid obscuring the details of the depicted embodiments. As illustrated in FIG. 1G, the data of storage units 152[B][M+1]-152[B][P] may be relocated to the remaining write capacity available in storage division 154N (storage unit 152[N][P]) and to storage division 154A (e.g., storage units 152[A][1]-152[A][L]). The data may be relocated by use of a relocation module of the erase manager 136 by, inter alia, rewriting the data to the storage medium and/or updating associations between LIDs of the data and the physical storage addresses of the rewritten data. Accordingly, relocating valid data from the storage division 154B may consume a portion of the write capacity of the storage medium 150 (e.g., incur a write amplification penalty due to rewriting the valid data on the storage medium 150). After relocating the data from storage division 154B, and assuming no intervening write requests are performed, the remaining write capacity may comprise P-L storage division 154. In response to relocating valid data from storage division 154B, the existing data in the storage division 154B may be marked as invalid (since the data has been rewritten to other portions of the storage medium 150). The erase manager 136 may, therefore, determine that the storage division 154B is prepared to be erased and may move the storage division 154B into a reset queue 135.

As disclosed above, the erase manager 136 may adapt the reset operation on the storage division 154B to minimize the erase dwell time of the storage division 154B. Accordingly, the erase manager 136 may delay the initiation of the erase operation on the storage division 154B for a delay period and/or until a write capacity threshold is satisfied. Satisfying the write capacity threshold may comprise determining that the available write capacity on the storage medium 150 is less than or equal to a particular threshold value. Alternatively, or in addition, the delay period may be based on projected fill time of the remaining write capacity ($\Delta T\_Fill$ of storage division 154A), projected write rate, projected erase latency of storage division 154B, and/or the like.

After the erase delay period and/or in response to determining that the write capacity threshold is satisfied, the erase manager 136 may erase the storage division 154B by use of the erase module 138. Erasing the storage division 154B may comprise transitioning the storage units 152[B][1]-152[B][P] to a writable state, adding the storage division 154B to the write capacity metadata 113 (e.g., in a write queue), updating the write capacity metadata 161 (e.g., to 2P-L, assuming no intervening storage requests), and so on, as disclosed herein.

In some embodiments, the erase manager 136 may be further configured to reduce erase dwell time by, inter alia, erasing portions of storage divisions 154A-N in stages. As disclosed above in conjunction with FIG. 1B, a storage division 154A-N may comprise a plurality of physical erase blocks on different respective storage elements 156A-Y. In one embodiment, the erase manager 136 is configured to erase regions of a storage division 154A-N as the regions are needed to service storage requests. Erasing a region of a storage division 154A-N may comprise erasing a subset of the physical erase blocks comprising the storage division 154A-N. Write operations may continue within erased portions of the storage division 154A-N, and other regions may be erased as additional write capacity is required.

Figure 2A:
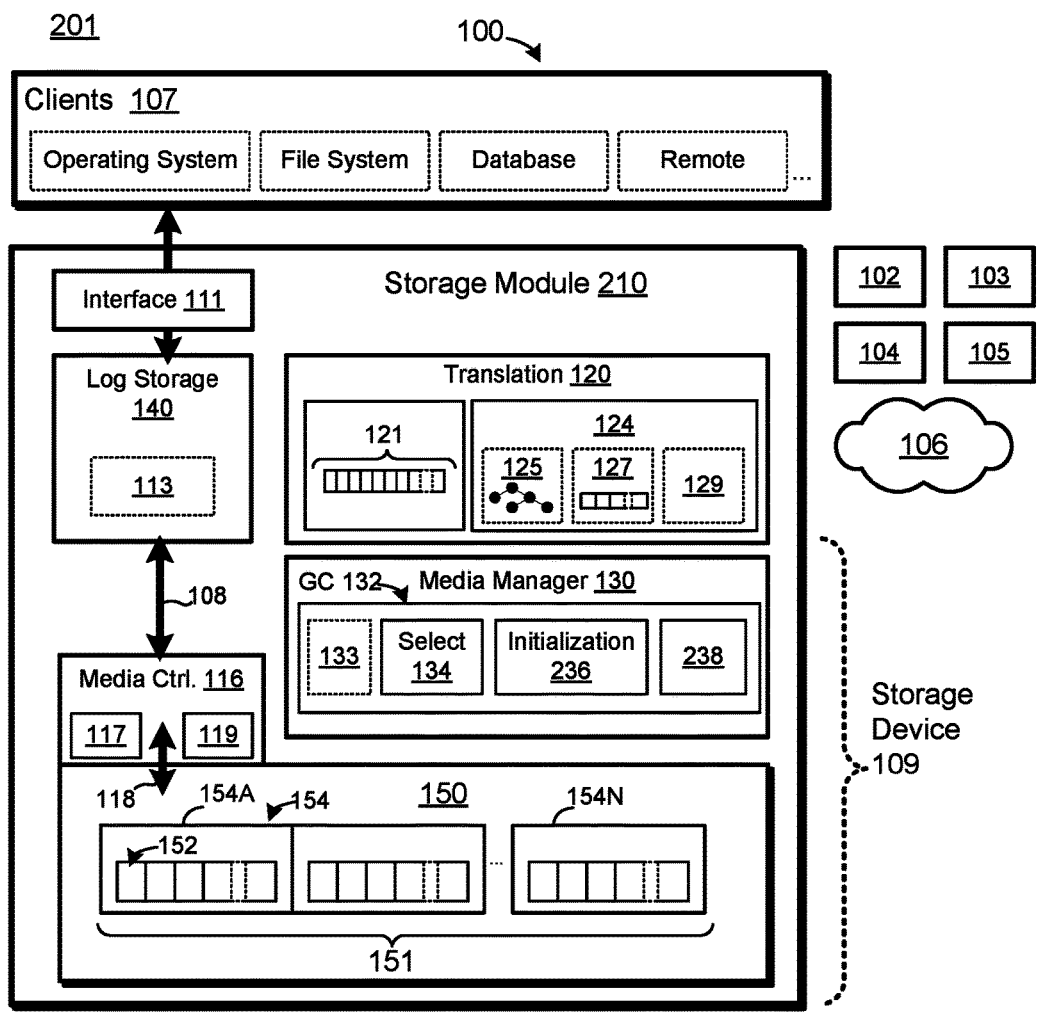
FIG. 2A is a schematic block diagram of one embodiment of a storage module.

FIG. 2A is a schematic block diagram of one embodiment 201 of a storage module 210 configured to provide storage services to clients 107 by use of a storage medium 150. The storage module 210 may comprise hardware and/or software components, as disclosed herein. In some embodiments, the storage module 210 comprises and/or is configured for operation on a computing system 100, as disclosed herein.

The storage module 210 may comprise a log storage module 150 configured to, inter alia, leverage the logical-to-physical translation layer implemented by the translation module 120 to maintain a storage log 241 within the storage address space 151 of the storage medium 150. The log storage module 140 may be configured to store data in within a "storage log," and/or in a "log structured format" or "log format." As used herein, a "storage log" and/or "log structured format" refers to an ordered arrangement of log entries stored within the storage address space 151. As disclosed above, data stored in a storage log may comprise and/or be associated with persistent, crash safe metadata that is configured to, inter alia, identify the data (e.g., indicate a context of the stored data). The persistent, crash safe metadata may include any suitable information pertaining to the stored data, including, but not limited to: translation metadata (e.g., logical-to-physical translation metadata), the logical interface of data in the storage log (e.g., LIDs associated with the data), modifications to logical-to-physical translations, information pertaining to the owner of the data, access controls, data type, relative position or offset of the data within another data structure (e.g., an object), information pertaining to storage operation(s) associated with the data (e.g., atomic storage operations, transactions, and/or the like), sequence information, data storage parameters (e.g., compression algorithm, encryption, etc.), and/or the like.

Figure 2B:
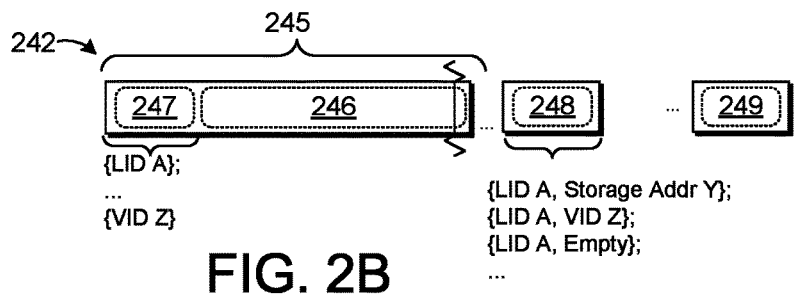
FIG. 2B depicts embodiments of storage log entries.

FIG. 2B illustrates embodiments of storage log entries 242, including a data storage log entry (data packet 245), a metadata entry 248, and log sequence metadata (e.g., sequence information 249). The data packet 245 may comprise a data block 246 and persistent metadata 247. The data block 246 may be of any arbitrary length and/or size. The persistent metadata 247 may be embodied as one or more header fields of the data packet 245. The persistent metadata 247 of the data packet 245 may comprise a metadata entry pertaining to the data block 246. The persistent metadata 247 may comprise the logical interface of the data block 246, such as the LID(s) associated with the data block 246 (e.g., LID A, VID Z, and/or the like) and/or other identifiers associated with the data block 246 (e.g., intermediate and/or virtual identifier Y). Although FIG. 2B depicts a particular embodiment of a data packet 245, the disclosure is not limited in this regard and could associate data (e.g., data block 246) with persistent, crash safe metadata in other ways including, but not limited to: an index on the storage medium 150 (and/or other storage device), a storage division index, a separate metadata log, a metadata entry 248, and/or the like. Accordingly, in some embodiments, the data entries 245 may be associated with separate metadata entries 248 (described in further detail below) and, as such, may not include a persistent metadata header 247.

FIG. 2B further depicts embodiments of a metadata entry 248. As disclosed above, a metadata entry refers to an entry in the storage log comprising persistent, crash safe metadata pertaining to the storage log. A metadata entry 248 may include but is not limited to: translation metadata (e.g., logical-to-physical translation metadata), the logical interface of data in the storage log (e.g., LIDs associated with the data), modifications to logical-to-physical translations, information pertaining to the owner of the data, access controls, data type, relative position or offset of the data within another data structure (e.g., an object), information pertaining to storage operation(s) associated with the data (e.g., atomic storage operations, transactions, and/or the like), log sequence information, data storage parameters (e.g., compression algorithm, encryption, etc.), and/or the like. As illustrated in FIG. 2B, the metadata entry 248 may comprise: a) logical-to-physical mapping information that associates LID(s) with data stored in the log (and/or modifies existing logical-to-physical mappings (e.g., maps LID A to storage address Y, {LID A, Storage Addr Y}), and may comprise logical-to-virtual mapping information that associates LIDs with particular intermediate and/or virtual identifiers (e.g., maps LID A to VID Z, {LID A, VID Z}), indicates that LID A is empty, deleted, unmapped, TRIMed, {LID A, Empty}), indicates that LID A corresponds to data that is unreadable and/or corrupt {LID A, Corrupt}, and/or the like.

The log entries 242 disclosed herein may be associated with log sequence metadata that defines, inter alia, the relative order of the log entries 242 within the storage log (e.g., sequence information 249). The sequence information 249 of FIG. 2B may be used to determine the relative log order of storage divisions 154 comprising a storage log. In some embodiments, the log storage module 140 appends log entries 242 sequentially within storage divisions 154A-N of the storage medium 150. Each storage division 154A-N may be capable of storing a large number of data packets (e.g., may comprise a plurality of storage units 152). Storage divisions 154A-N may be assigned sequence information 249 at the time the storage divisions 154A-N are initialized for use (e.g., erased), programmed, closed, and/or the like. The sequence information 249 may determine the log order of the storage divisions 154A-N (e.g., order in which data was appended within the respective storage divisions 154A-N). Accordingly, the log order of an entry 242 in the storage log may be determined by: a) the relative position of the entry 242 within a particular storage division 154A-N, and b) the log order of the storage division 154A-N as determined by the corresponding sequence information 249.

Figure 2C:
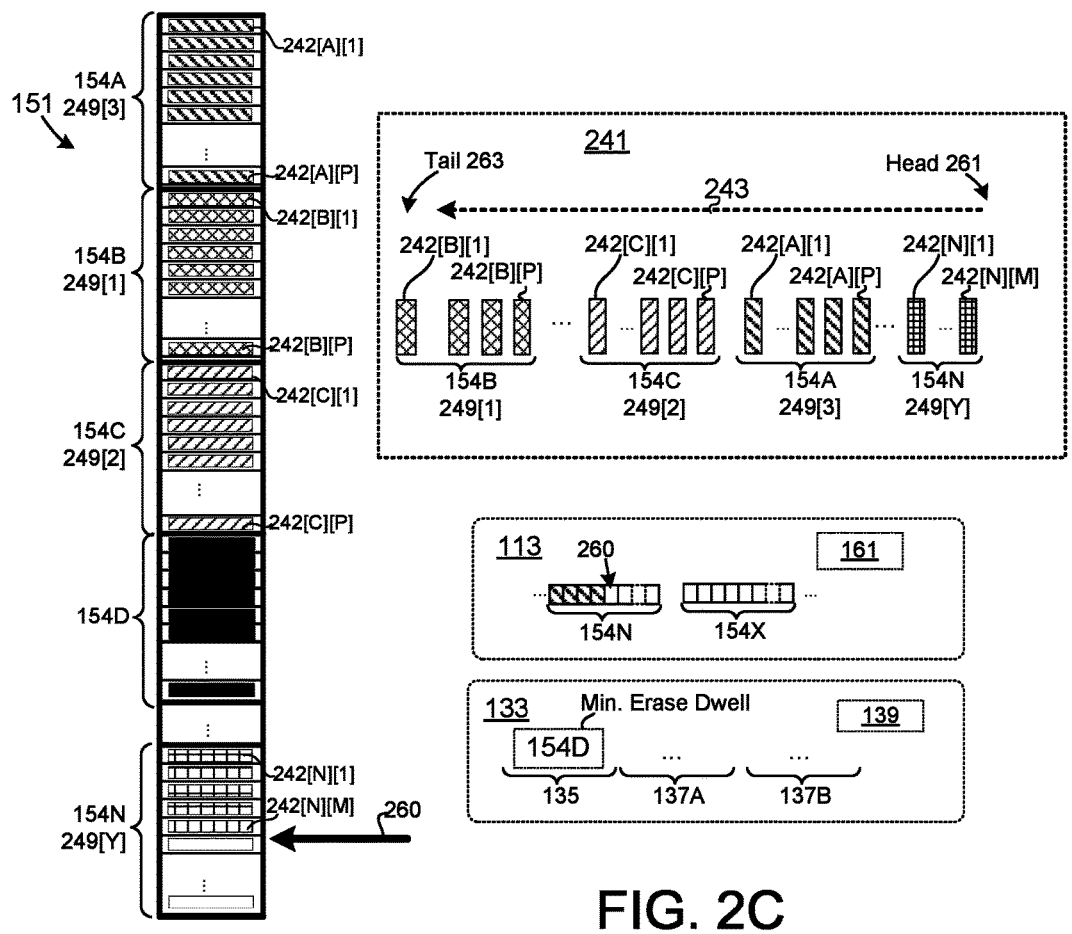
FIG. 2C depicts embodiments of storage division selection operations and erase dwell minimization for a storage log.

FIG. 2C depicts one embodiment of a storage log 241. The storage log 241 may comprise a plurality of log entries 242 stored sequentially within the storage address space 151 of the storage medium 150. As disclosed above, the log order 243 of the entries 242 may be determined based on a) the offset of the entries 242 within the respective storage divisions 154A-N and b) the sequence information 249 associated with the storage divisions 154A-N.

The log storage module 140 may be configured to append log entries 242 sequentially within the storage address space 151 (e.g., within storage divisions 154A-N), by use of, inter alia, the media controller 116. The log storage module 140 may be configured to fill respective storage divisions 154A-N before appending data to other storage divisions 154A-N. The order in which data is appended within the respective storage divisions 154A-N may be determined according to the availability of erased and/or initialized storage divisions 154A-N (e.g., a write capacity metadata 113 of the log storage module 140, as disclosed herein).

In the FIG. 2C embodiment, the log storage module 140 may have stored entries 242[A][1]-242[A][P] sequentially within storage division 154A, such that log entry 242[A][P] is ordered later in the storage log 241 (stored more recently) relative to data packet 242[A][1]. FIG. 2C further illustrates entries 242 stored sequentially within other storage divisions 154B-N: entries 242[B][1]-242[B][P] are stored sequentially within storage division 154B, log entries 242[C][1]-242[C][P] are stored sequentially within storage division 154C, data packets 242[N][1]-242[N][P] are stored sequentially within storage division 154N, and so on. The storage division 154D may comprise invalid data and, as such, may not comprise valid stored log entries 242 nor be assigned sequence information 249.

As disclosed above, the log storage module 140 may mark storage divisions 154A-N with respective sequence information 249[1]-249[Y] that defines the order in which data was programmed to the storage divisions 154A-N. Accordingly, the log order 243 of the entries 242[A][1]-242[N][M] may be defined by, inter alia, the sequence information 249[1]-249[Y] assigned to the respective storage divisions 154A-N. In some embodiments, sequence information 249 is stored at a predetermined location within the respective storage divisions 154A-N (e.g., in a header, at a predetermined offset, and/or the like). Alternatively, sequence information 249 pertaining to the storage divisions 154A-N may be stored at a designated storage address. The sequence information 249[1]-249[Y] may be stored on the storage divisions 154A-N during initialization: when selected for use by the log storage module 140, and/or placed in a write capacity queue (maintained in the write capacity metadata 113); when data is appended to the storage divisions 154A-N; when the storage divisions 154A-N are closed; and/or the like.

In the FIG. 2C embodiment, the sequence information 249[Y] may correspond to the most recent (youngest) storage division 154A-N within the storage log 241, and the sequence information 249[1] may correspond to the earliest (oldest) storage division 154A-N within the storage log 241. Therefore, and as illustrated in FIG. 2C, the log order 243 of the storage divisions 154A-N may be: 154N (most recent), 154A, 154C, and 154B (oldest). The order of the individual entries 242[A][1]-242[N][M] within the storage log 241 may be determined based on the sequence information 249 of the storage divisions 154A-N and the relative storage addresses of the entries 242[A][1]-242[N][M] within the respective storage divisions 154A-N. In the FIG. 2C embodiment, the log order 243 from most recent (head 261 of the storage log 241) to oldest (tail 263 of the storage log 241) is: 242[N][M]-242[N][1], 242[A][P]-242[A][A], 242[C][P]-242[C][1], and 242[B][P]-242[B][1].

The log storage module 140 may be configured to append entries 242 sequentially at an append point 260 within the storage log 241 (at the head 261 of the storage log 241). The append point 260 may address a writable storage unit 152 within a storage division 154A-N, as disclosed above. The log storage module 140 may advance the append point 260 sequentially within the storage address space 151 of the respective storage divisions 154A-N (e.g., from storage address 0 to storage address N of the respective storage divisions 154A-N). The disclosure is not limited in this regard, however, and could be adapted to advance the append point according to any sequence and/or pattern (e.g., from storage address N to 0, according to a particular fill pattern, and/or the like). After filling (and/or substantially filling) the storage division 154N, the log storage module 140 may advance the append point 260 to a next available storage division 154A-N. As disclosed herein, an available storage division refers to a storage division that is in a writeable state (has been initialized).

As disclosed above, the storage module 210 may comprise a garbage collector 132 to perform garbage collection operations on the storage divisions 154A-N, which may comprise initializing storage divisions 154A-N and/or making the storage divisions 154A-N available to the log storage module 140 to store new log entries 242, as disclosed herein. The garbage collector 132 may be configured to select storage divisions 154A-N for recovery by use of a primary selection metric and/or one or more secondary selection metrics. The selector module may be further configured to override the primary selection metric with an alternative selection metric under certain conditions (e.g., in response to a wear metric variance of the storage divisions 154A-N exceeding a threshold). The selector module 134 may identify storage divisions 154A-N comprising aged data (e.g., having high data retention times) based on the log order 243 of the storage log. In some embodiments, the selector module 134 evaluates storage divisions 154A-N for recovery from the log tail 263 towards the log head 261. The primary selection metric for selecting storage divisions to recover, however, may be based on invalid data metrics of the storage divisions 154A-N as opposed to data retention time, which, as disclosed above, may be used as a secondary selection metric.

As disclosed above, the log module 140 may be configured to append data at the current log append point 260. In the FIG. 2C embodiment, the append point 260 references storage division 154N. The log storage module 140 may maintain a write capacity queue (e.g., in the write capacity metadata 113), as disclosed above, which may indicate the current append point 260 and/or identify other available write capacity on the storage medium 150 (e.g., in write capacity metadata 161). As illustrated, the available write capacity on the storage medium 150 may be limited to the storage division 154N. Referring to FIG. 2A, the log storage module 140 may request additional write capacity from the media manager 130, which may generate additional write capacity by a) selecting a storage division 154A-N for recovery, by use of the selector module 134, b) preparing the selected storage division 154A-N to be erased, and c) erasing the selected storage division 154A-N, as disclosed herein. Storage divisions 154A-N selected for recovery may be initialized by the initialization module 236. The initialization module 236 may be configured to prepare storage divisions 154A-N to be reset by, inter alia, relocating valid data on the selected storage divisions 154A-N by use of the relocation module 238. Relocating valid data from a storage division 154A-N may comprise appending the data at the head of the storage log 241 (e.g., at the current append point 260). The initialization module 236 may be further configured to delay, schedule, and/or trigger erase operations on storage divisions 154A-N to minimize the erase dwell time of the storage divisions 154A-N. Minimizing erase dwell time may comprise delaying, scheduling, and/or triggering erase operations, such that the operations complete at the time the corresponding storage division 154A-N is needed for use (e.g., is needed to append additional entries to the storage log 241).

In the FIG. 2C embodiment, the selector module 134 may select storage division 154D for recovery. The initialization module 236 may determine that the storage division 154D is prepared to be erased (e.g., does not comprise valid data to retain on the storage medium 150). The initialization module 236 may delay the reset operation on the storage division 154D for an erase delay period and/or until a write capacity threshold is satisfied. In some embodiments, the initialization module 236 is configured to initiate a reset operation on the storage division 154D in response to filling a threshold amount of the storage division 154A-N comprising the append point 260 of the storage log 241 (e.g., storage division 154N). The fill threshold (T_Filled) may be based on a projected write latency of the storage division 154N, write rate to the storage division 154N, erase latency of the storage division 154D, and so on, as disclosed herein. Alternatively, or in addition, the initialization module 236 may be configured to initiate erasure of the storage division 154D in response to filling a threshold portion and/or ratio of the available write capacity on the storage medium 150 (e.g., T_FillRatio) and/or determining that a threshold amount of write capacity remains available on the storage medium 150.

As disclosed above, in some embodiments, the initialization module 236 may be configured to optimize recovery operations to minimize the likelihood of write stalls, which may comprise increasing the T_Remain threshold and/or maintaining one or more writable storage divisions 154A-N in an available write pool. In FIG. 2C, the initialization module 236 may be configured to maintain a reserve storage division 154A-N in addition to the write capacity remaining in storage division 154N (e.g., storage division 154X). The available write capacity may, therefore, comprise the write capacity of storage division 154N and the write capacity of storage division 154X. The initialization module 236 may be configured to erase storage division 154D when the overall write capacity of storage division 154N and 154X fall below a threshold (T_Remain). Alternatively, or in addition, the initialization module 236 may be configured to initiate the erase operation on storage division 154D, such that the operation is projected to complete at the time data is written to the reserve storage division 154X (e.g., ensure availability of one or more writable storage divisions 154A-N). In another embodiment, the initialization module 236 is configured to erase the storage division 154D in response to appending data to filling storage division 154N, advancing the append point 260 to storage division 154X, and/or writing a log entry 242 to storage division 154X.

Figure 3:
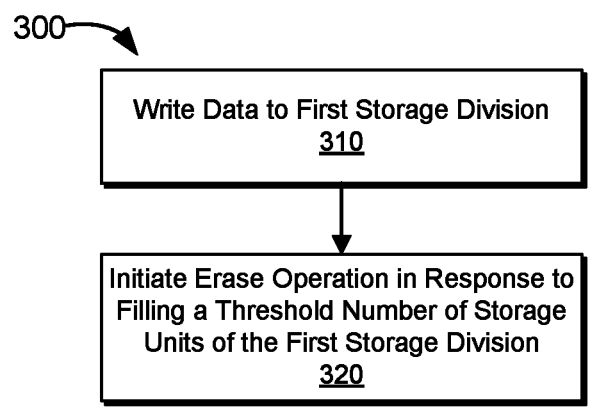
FIG. 3 is a flow diagram of one embodiment of a method for managing storage erase operations.

FIG. 3 is a flow diagram of one embodiment of a method for managing storage erase operations. Step 310 may comprise writing data to a first storage division 154A-N of a solid-state storage medium 150. The solid-state storage medium 150 may have write-once properties, as disclosed herein. Step 310 may comprise writing data at pointer 160 within the first storage division 154A-N. Alternatively, step 310 may comprise appending data to a storage log 241 at an append point 260 within the first storage division 154A-N.

Step 320 may comprise initiating an erase operation on a second storage division 154A-N in response to filling a threshold number of storage units 152 and/or available write capacity within the first storage division 154A-N. Step 320 may further include selecting the second storage division 154A-N for recovery by use of the selector module 134, as disclosed herein. In some embodiments, step 320 further includes determining the threshold number of storage units 152 based on one or more of a write latency for the first storage division 154A-N, a projected write rate, and/or a projected erase latency for the second storage division 154A-N, as disclosed herein.

Figure 4:
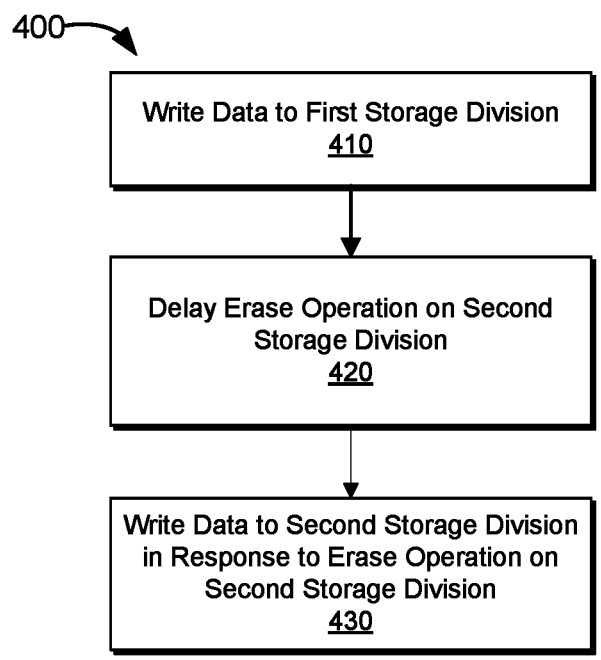
FIG. 4 is a flow diagram of one embodiment of a method for efficiently reducing erase dwell conditions.

FIG. 4 is a flow diagram of one embodiment of a method for efficiently reducing erase dwell conditions. Step 410 may comprise writing data to a first storage division 154A-N, as disclosed above. Step 420 comprises delaying an erase operation on a second storage division. Step 420 may comprise selecting the second storage division 154A-N for garbage collection based on one or more of a primary selection metric, secondary selection metrics, and/or an alternative selection metric, as disclosed herein. In some embodiments, step 420 comprises selecting the second storage division 154A-N based on an amount of invalid data stored within the storage division 154A-N. Step 420 may further include preparing the storage division 154A-N to be erased, which may comprise relocating valid data stored on the second storage division 154A-N (if any). Step 420 may comprise delaying the erase operation until a threshold number of the storage units 152 and/or write capacity of the first storage division 154A-N have been filled (e.g., T_Filled). Alternatively, step 420 may comprise delaying the erase operation until a threshold amount of the write capacity of the first storage division 154A-N has been consumed (e.g., T_FillRatio). In another embodiment, step 420 may comprise delaying the erase operation until a threshold amount of write capacity remains in the first storage division 154A-N (e.g., T_Remain). The threshold(s) of step 420 may comprise pre-determined values applicable to the storage divisions 154A-N of the storage medium 150. Alternatively, the threshold(s) of step 420 may be calculated in accordance with profiling metadata 129 pertaining to the first storage division 154A-N and/or second storage division 154A-N and/or projected operating conditions, such as projected write rate. In another embodiment, the delay of step 420 may be configured in accordance with a projected fill time of the first storage division 154A-N (e.g., $\Delta T\_Fill$) and/or erase latency of the second storage division 154A-N (e.g., $\Delta T\_Erase$).

In some embodiments, step 420 comprises delaying the erase operation until a write capacity threshold is satisfied. The write capacity threshold may correspond to available write capacity remaining in the first storage division 154A-N and/or write capacity available in one or more other storage divisions 154A-N (e.g., in a reserve pool). Step 420 may comprise initiating the erase operation on the second storage division 154A-N in response to the available write capacity on the storage medium 150 falling below a threshold. In another embodiment, step 420 may comprise delaying the erase operation on the second storage division 154A-N until one or more of: a) filling the first storage division 154A-N, b) advancing a write pointer 160 and/or append point 260 from the first storage division 154A-N (e.g., to a third storage division 154A-N), c) writing data to another storage division 154A-N (e.g., writing data to a third storage division 154A-N), and/or the like.

Step 430 may comprise implementing the erase operation on the second storage division 154A-N after the delay period of step 420. The erase operation may comprise resetting the second storage division 154A-N into a writable state, as disclosed herein. Step 430 may further comprise making the second storage division 154A-N available for use in servicing storage requests by, inter alia, placing the second storage division 154A-N into a write capacity queue.

Figure 5:
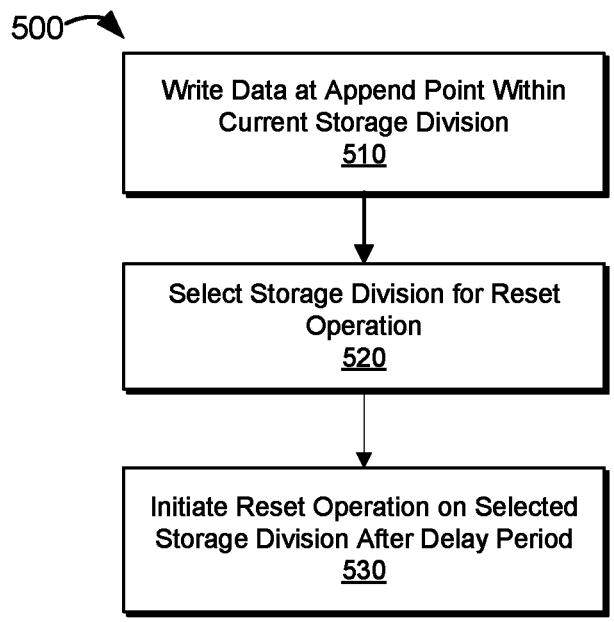
FIG. 5 is a flow diagram of one embodiment of a method for managing erase dwell conditions on storage divisions of a storage medium.

FIG. 5 is a flow diagram of one embodiment of a method for managing erase dwell conditions on storage divisions of a storage medium 150. Step 510 comprises writing data at an append point 260 (and/or pointer 160) within a current storage division 154A-N. The current storage division 154A-N may comprise a storage division comprising writable storage units 152. In some embodiments, step 510 comprises appending entries 242 to a storage log 241, as disclosed herein.

Step 520 comprises selecting a storage division 154A-N for a recovery operation. Step 520 may comprise selecting the storage division 154A-N for use as a next append point. Step 520 may comprise identifying a storage division 154A-N comprising data that does not need to be retained on the storage medium 150 (e.g., invalid data), a storage division having low wear relative to other storage divisions 154A-N, and/or the like. Accordingly, step 520 may comprise selecting a storage division 154A-N in accordance with a greedy selection algorithm, an invalid data metric, a granular invalid data metric, an adaptive invalid data metric, a wear metric, and/or one or more secondary selection metrics (e.g., data retention time, wear, and/or the like).

Step 530 comprises initiating a reset operation on the selected storage division 154A-N after a delay period. The delay period may correspond to filling a threshold number of storage units 152 within the current storage division 154A-N, filling a threshold ratio of the write capacity of the current storage division 154A-N, and/or determining that a threshold amount of write capacity remains in the current storage division 154A-N. Alternatively, or in addition, step 530 may comprise estimating the time the selected storage division will be needed in servicing write requests based on, inter alia, projected fill time for the current storage division 154A-N, projected erase latency of the selected storage division 154A-N, and/or the like. Step 530 may further include resetting the selected storage division 154A-N after the delay period. Resetting the selected storage division 154A-N may include erasing, clearing, formatting, and/or reinitializing the selected storage division 154A-N to place the selected storage division 154A-N into a writable state.

Figure 6:
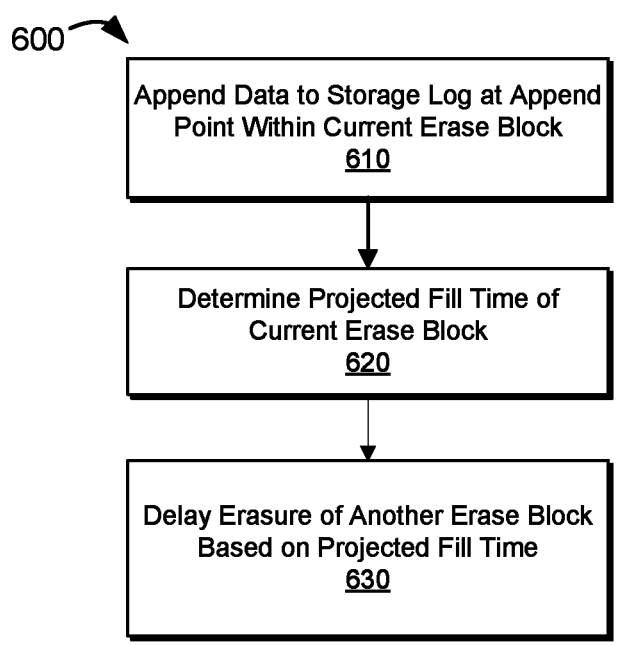
FIG. 6 is a flow diagram of one embodiment of a method for reducing erase block wear due to erase dwell.

FIG. 6 is a flow diagram of one embodiment of a method for reducing erase block wear due to erase dwell. Step 610 comprises appending data within a current erase block at an append point 260 and/or pointer 160. Step 620 may comprise determining a projected fill time of the current erase block based on, inter alia, write latency of the erase block, projected write rate, and so on. Step 630 may comprise delaying erasure of another erase block based on the projected fill time of step 620. Step 630 may include selecting the erase block for a storage recovery operation (e.g., to reclaim the storage capacity of the erase block). Step 630 may further include determining a delay period based on the projected fill time, projected latency for erasure of the selected erase block, and/or the like. Step 630 may further include erasing the selected erase block, placing the erase block into a write capacity queue, and/or writing data to the erase block, as disclosed herein.

Figure 7:
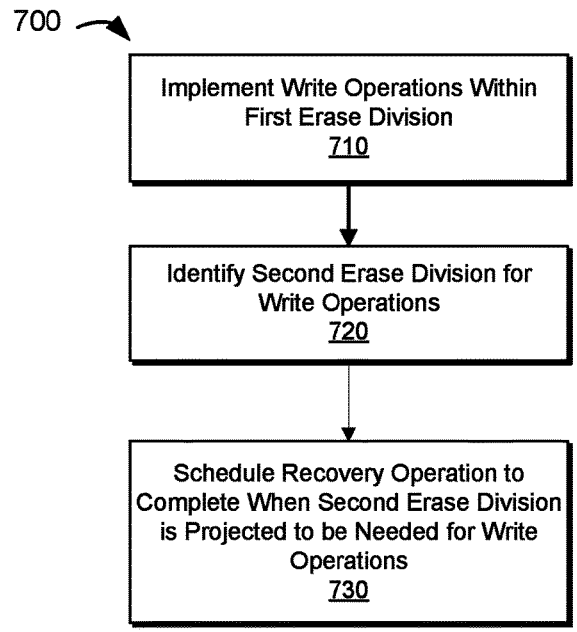
FIG. 7 is a flow diagram of one embodiment of a method for minimizing erase dwell of erase divisions of a storage medium.

FIG. 7 is a flow diagram of one embodiment of a method for minimizing erase dwell of erase divisions of a storage medium 150. Step 710 may comprise implementing write operations within a first erase division. Step 710 may comprise servicing storage requests received through a storage interface 111, as disclosed herein. Step 710 may further comprise appending data to a storage log 241 at an append point 260 and/or writing data at a pointer 160 within the first erase division.

Step 720 may comprise identifying a second erase division for use in servicing write operations, as disclosed herein. Step 730 may comprise scheduling a recovery operation on the second erase division, such that the recovery operation is scheduled to complete at the time the second erase division is needed for write operations. Step 730 may comprise delaying the recovery operation on the second erase block in accordance with a projected fill time of the first erase division, a projected erase latency of the second erase division, and/or a projected write rate, as disclosed herein. Step 730 may comprise scheduling the recovery operation to begin in response to filling a threshold number of storage units 152 within the first erase division, filling a threshold ratio of the write capacity of the first erase division, falling below a remaining write capacity threshold within the first erase division, and/or the like. Alternatively, step 730 may comprise scheduling the recovery operation to begin in response to an overall write capacity available on the storage medium 150 falling below a threshold, advancing a write pointer 160 and/or append point 260 to another erase division, writing data to another erase division, and/or the like. Step 730 may further include recovering the second erase division and/or writing data to writable storage units 152 within the second erase division.

Figure 8:
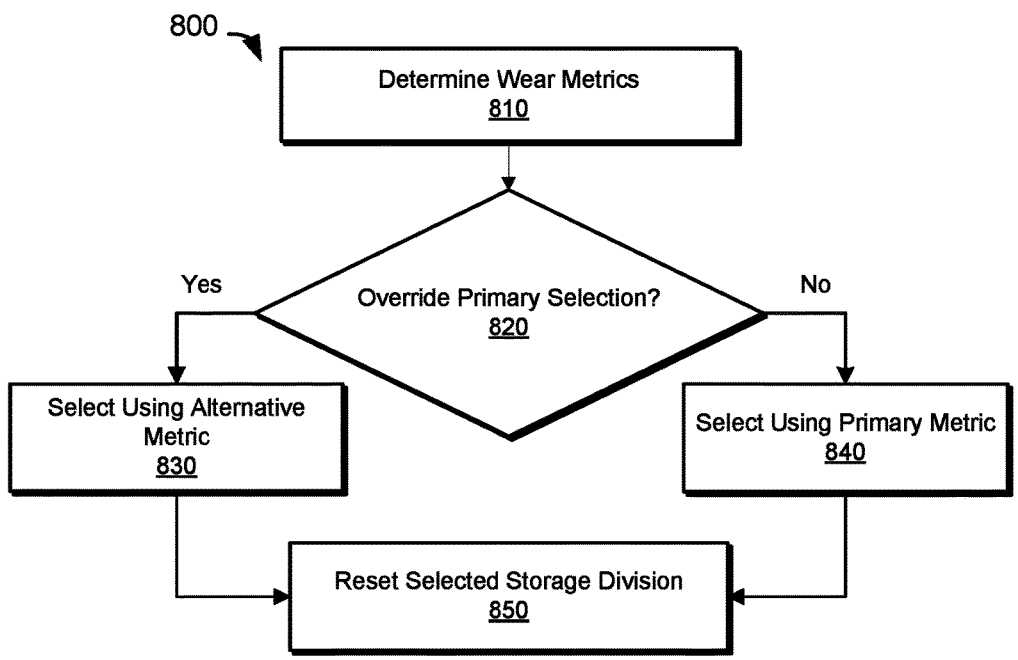
FIG. 8 is a flow diagram of one embodiment of a method for selecting storage resources for recovery.

FIG. 8 is a flow diagram of one embodiment of a method 800 for selecting storage resources for recovery operations. Step 810 may comprise determining wear metrics of storage divisions 154A-N of a solid-state storage medium 150. The wear metrics may quantify the amount of wear incurred on the storage divisions 154A-N. The wear metrics of step 810 may be based on one or more of: program and/or write cycle count, read operation count, erase cycle count, reset cycle count, initialization cycle count, PE cycle count, erase dwell time, error rate, and/or the like. The wear metrics of step 810 may be derived from monitoring storage operations performed on the storage medium 150 and/or by use of profiling metadata 129, as disclosed herein.

Step 820 comprises determining whether to override a primary selection metric with an alternative selection metric. The primary selection metric may correspond to one or more of an invalid data metric, a granular invalid data metric, an adaptive invalid data metric, one or more secondary metrics, and/or the like. Step 820 may be based on wear conditions on the storage medium. In one embodiment, step 820 comprises determining whether differences in wear metrics of the storage divisions 154A-N exceed a threshold. Step 820 may comprise determining whether to override the primary selection metric in response to a difference between the highest PE count (PE_High) and a low PE count (PE_Low) exceeding a difference threshold (T_PECount), such that PE_High−PE_Low≥T_PECount. In another embodiment, step 820 comprises determining whether to override the primary selection metric based on whether a difference between a PE count of particular storage divisions 154-N and an average PE count of the storage divisions 154A-N (PE_Ave) exceeds a threshold (T_PEAve), such that |PE_Ave−PE_CountB|≥T_PEAve. Alternatively, or in addition, step 820 may comprise modeling a distribution of wear metrics of the storage divisions 154A-N and/or overriding the primary selection metric in response to a deviation, the variance of the wear distribution exceeding a threshold, and/or the like.

Step 820 may further comprise limiting overrides of the primary selection metric to a particular period and/or frequency (e.g., one override per N selections). Step 820 may, therefore, comprise determining whether N selections using the primary selection metric have occurred since a last override of the primary selection metric.

Step 830 comprises selecting a storage division 154A-N to recover based on an alternative selection metric in response to determining to override the primary selection metric at step 820. Step 830 may comprise selecting a storage division 154A-N to recover based on wear metrics of the storage divisions 154A-N (e.g., select a storage division 154A-N having the lowest amount of wear and/or greatest remaining life), as disclosed herein.

Step 840 may comprise selecting the storage division 154A-N by use of a primary selection metric. As disclosed herein, the primary selection metric may comprise an invalid data metric, a granular invalid data metric, an adaptive invalid data metric, and/or one or more secondary selection metrics and/or criteria, as disclosed herein.

Step 850 may comprise resetting the selected storage division 154A-N, which may comprise a) preparing the selected storage division 154A-N to be reset, and b) resetting the storage units 152 of the selected storage division 154A-N to a writable state. Preparing the selected storage division 154A-N to be reset may comprise relocating valid data from the selected storage division 154A-N (if any). Resetting the storage division 154A-N may comprise scheduling, delaying, deferring and/or triggering the reset operation to minimize erase dwell time, as disclosed herein.

Figure 9:
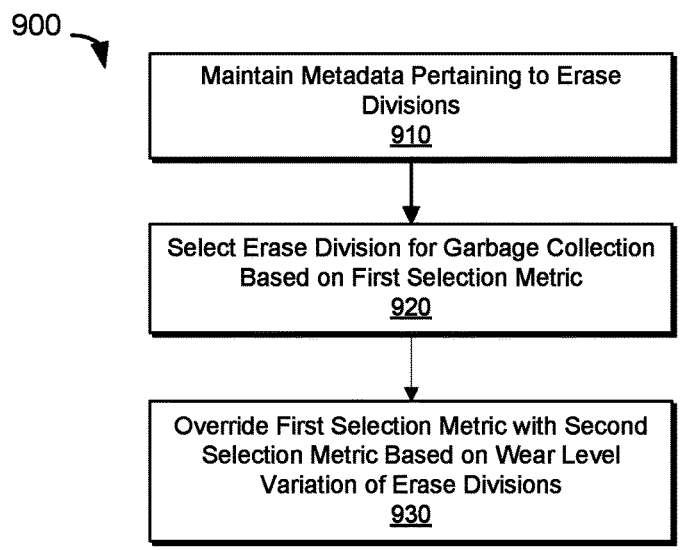
FIG. 9 is a flow diagram of one embodiment of a method for determining a selection metric for garbage collection operations.

FIG. 9 is a flow diagram of one embodiment of a method 900 for determining a selection metric for garbage collection operations. Step 910 may comprise maintaining metadata pertaining to erase divisions of a solid-state storage medium 150. Step 910 may comprise monitoring storage operations on the erase divisions recording characteristics of the storage operation in profiling metadata 129, as disclosed herein. The metadata of step 910 may include wear metrics, such as program count, write count, PE cycle count, erase dwell time, and so on, as disclosed herein. The metadata 910 may further include validity information to identify invalid data stored in the erase divisions.

Step 920 may comprise selecting an erase division for garbage collection based on a first selection metric. The first selection metric may correspond to an amount of invalid data within the erase divisions. The first selection metric may comprise one or more of an invalid data metric, a granular invalid data metric, an adaptive invalid data metric, one or more secondary metrics, and/or the like.

Step 930 may comprise overriding the selection of step 930 with a selection made using a second, different selection metric. The metric of step 930 may correspond to wear conditions of the erase divisions. Step 930 may comprise determining that wear differences, deviations, and/or variances between the erase divisions exceed an override threshold. Step 930 may comprise replacing the selection of step 920 based on an amount of invalid data within the erase divisions, with an erase division selected in accordance with a wear metric. Accordingly, the selection of step 930 may be independent of the amount of invalid data within the erase divisions. Step 930 may further comprise implementing a garbage collection operation on the selected erase division, as disclosed herein.

Figure 10:
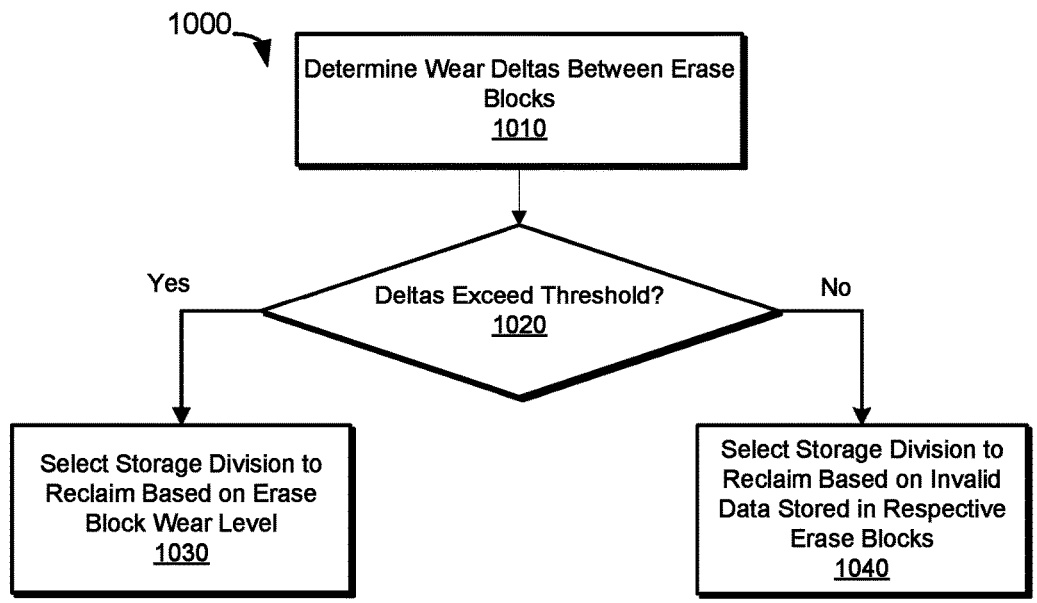
FIG. 10 is a flow diagram of one embodiment of a method for selecting a storage division to reclaim.

FIG. 10 is a flow diagram of one embodiment of a method for selecting a storage division to reclaim. Step 1010 may comprise determining one or more deltas in wear metrics of one or more storage divisions 154A-N of a storage medium 150. Step 1010 may comprise calculating a difference in wear metrics of a high-wear storage division 154A-N and a low-wear storage division 154A-N. Alternatively, or in addition, step 1010 may comprise calculating deltas between storage division wear metrics and an average wear metric of the storage divisions 154A-N. In another embodiment, step 1010 comprises calculating a deviation and/or variance in wear metrics, modeling a distribution of wear metrics, and/or the like.

Step 1020 comprises determining whether one or more of the wear metrics deltas of step 1010 exceed a threshold. Step 1020 may comprise determining whether to override a primary selection metric and/or criterion with an alternative selection metric and/or criterion. Step 1020 may, therefore, comprise determining whether to select a storage division 154A-N for recovery based on an amount of invalid data within the storage division 154A-N (e.g., invalid data metric, granular invalid data metric, adaptive invalid data metric, and/or the like), or a selection metric based on wear metrics of the storage divisions 154A-N. Step 1020 may further include limiting the frequency of overrides to a particular frequency, as disclosed herein.

Step 1030 comprises selecting a storage division 154A-N to reclaim based on a wear level metric. Step 1030 may be implemented in response to determining that the wear level deltas exceed the threshold at step 1020 (and/or that the frequency threshold for overrides of the primary selection metric is satisfied).

Step 1040 comprises selecting a storage division 154A-N to reclaim by use of the primary selection metric and/or criteria. Step 1040 may be implemented in response to determining that the wear level deltas do not exceed the threshold at step 1020 (and/or that overriding the primary selection metric would exceed a pre-determined override limit).

Steps 1030 and/or 1040 may further include reclaiming the selected storage division 154A-N, as disclosed herein.

Figure 11:
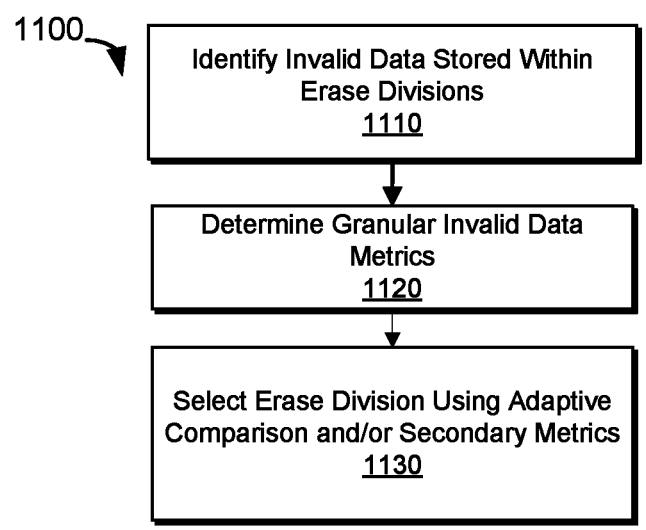
FIG. 11 is a flow diagram of one embodiment of a method for selecting erase divisions for recovery based on invalid data metrics.

FIG. 11 is a flow diagram of one embodiment of a method 1100 for selecting erase divisions for recovery based on invalid data metrics. Step 1110 may comprise identifying invalid data within erase divisions of a storage medium 150. The invalid data may be identified by use of storage metadata 124, such as the forward map 125 and/or validity map 127, disclosed herein.

Step 1120 may comprise determining a granular invalid data metric for the respective erase divisions, as disclosed herein. Step 1120 may comprise quantizing the amount of invalid data in the erase divisions into a discrete set of granules (e.g., recovery blocks). Step 1120 may, therefore, comprise calculating an invalid data metric in terms of recovery block size. The recovery blocks may represent a storage capacity that is larger than the physical storage capacity of the storage units 152 of the erase divisions.

Step 1130 may comprise selecting an erase division to recover based on an adaptive comparison of the granular invalid data metrics of step 1120. As disclosed herein, an adaptive comparison and/or selection criterion refers to a comparison that is a function of the relative amounts of invalid data within the storage divisions. Step 1130 may comprise adjusting the resolution and/or weight of differences in invalid data metrics in accordance with the relative amount of invalid data within the erase divisions. In one embodiment, the adaptive comparison is configured to reduce the weight of differences in the invalid data metrics when comparing erase divisions comprising relatively large amounts of invalid data (since small differences in the overall amount of invalid data are unlikely to significantly affect write amplification). By contrast, differences in the invalid data metrics in comparisons between erase divisions comprising smaller amounts of invalid data may be weighted more heavily (since recovery of such storage divisions is likely to create significantly more write amplification). The adaptive comparison of step 1130 may comprise a logarithmic comparison of the invalid data metrics of the storage divisions (e.g., the approximate base 2 log of the raw and/or granular invalid data metrics of the erase divisions) and/or may comprise deriving adaptive invalid data metrics corresponding to the erase divisions. Erase divisions having similar adaptive invalid data metrics (and/or within a threshold) may be distinguished by use of a secondary selection metric, as disclosed herein (e.g., based on wear metric, data retention time, and/or the like). Step 1130 may further include recovering the selected erase division as disclosed herein.

The modules, components, layers, and/or facilities disclosed herein, including, but not limited to: the storage layer 110, storage manager 112, media controller 116, translation module 120, media manager 130, garbage collector 132, selector module 134, erase manager 136, log storage module 150, and so on, may be implemented in software, hardware, and/or a combination of software and hardware elements. In some embodiments, portions of the disclosed modules, components, and/or facilities are embodied as executable instructions stored on a non-transitory, machine-readable storage medium. The instructions may comprise computer program code that, when executed by a computing device, cause the computing device to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternative ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. As used herein, the terms "comprises," "comprising," and any other variation thereof are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the disclosure.

I claim:

1. An apparatus, comprising:
   a storage manager configured to write data to a first storage division of a solid-state storage medium; and
   an erase manager configured to perform erase operations on a second storage division of the solid-state storage medium, each erase operation to reset a respective portion of the second storage division from an unwriteable state to a writeable state,
   wherein the erase manager is configured to maintain a first portion of the second storage division in the unwriteable state until data have been written to a threshold amount of a storage capacity of the first storage division.

2. The apparatus of claim 1, wherein the erase manager is configured to perform a first erase operation to reset the first portion of the second storage division from the unwriteable state to the writeable state in response to the storage manager writing data to the threshold amount of the storage capacity of the first storage division.

3. The apparatus of claim 2, wherein the erase manager is configured to maintain a second portion of the second storage division in the unwriteable state in response to performing the first erase operation on the first portion of the second storage division.

4. The apparatus of claim 3, wherein the erase manager is configured to maintain the second portion of the second storage division in the unwriteable state until data are written to a predetermined amount of a storage capacity of the first portion of the second storage division.

5. The apparatus of claim 3, wherein the erase manager is configured to initiate a second erase operation to reset the second portion of the second storage division to the writeable state in response to filling a predetermined amount of a storage capacity of the first portion of the second storage division.

6. The apparatus of claim 5, wherein a determined amount is based on one or more of: a projected fill time of the first portion of the second storage division and a projected latency of the second erase operation.

7. The apparatus of claim 6, wherein the erase manager determines the projected fill time of the first portion of the second storage division based on one or more of a wear level of the second storage division, measured program latency of the second storage division, measured program latency of a plurality of storage divisions of the solid-state storage medium, and a projected rate of write operations on the second storage division.

8. The apparatus of claim 6, wherein the erase manager determines a protected latency of the second erase operation based on one or more of a wear level of the second storage division and a latency of one or more previous erase operations performed on the second storage division.

9. The apparatus of claim 1, further comprising a storage division selector configured to select the second storage division for recovery, wherein the erase manager is configured to delay the erase operations on the second storage division in response to selection of the second storage division for recovery by the storage division selector.

10. The apparatus of claim 1, further comprising a garbage collector configured to prepare the first portion of the second storage division for a first erase operation by relocating valid data stored on the first portion of the second storage division to one or more other storage divisions of the solid-state storage medium.

11. A system, comprising:
a storage device comprising a non-volatile storage medium having a plurality of erase blocks, the storage device configured to append data to a storage log on the non-volatile storage medium at an append point within a current erase block of the plurality of erase blocks; and
a media manager configured to prepare erase blocks for use as append points of the storage log, wherein, to prepare a particular erase block for use as a next append point of the storage log, the media manager is configured to:
delay erase operations on the particular erase block, such that the particular erase block is maintained in an un-erased state until data are appended to a threshold number of pages of the current erase block, and
perform a first erase operation to erase a first portion of the particular erase block in response to data being appended to the threshold number of pages of the current erase block, wherein a second portion of the particular erase block remains in the un-erased state in response to performing the first erase operation.

12. The system of claim 11, wherein the media manager is further configured to determine the threshold number of pages based on one or more of a wear level of the particular erase block and a latency of one or more previous erase operations performed on the particular erase block.

13. The system of claim 11, wherein the media manager is further configured to hold the second portion of the particular erase block in the un-erased state while data are appended to pages of the first portion of the particular erase block.

14. The system of claim 11, wherein the media manager is further configured to perform a second erase operation to erase the second portion of the particular erase block in response to appending data to one or more pages of the first portion of the particular erase block.

15. The system of claim 11, wherein the media manager is further configured to delay erasing the second portion of the particular erase block for a delay period, the delay period based on one or more of: an estimated fill time of the first portion of the particular erase block and an estimated erase latency for the second portion of the particular erase block.

16. The system of claim 15, wherein the estimated fill time is based on one or more of: wear level of the particular erase block, measured program latency of the particular erase block, measured program latency of a plurality of erase blocks of the solid-state storage medium, and a rate of write requests received at the storage device.

17. The system of claim 15, wherein the estimated erase latency for the second portion of the particular erase block is based on a number of program erase cycles performed on the particular erase block and a latency of one or more previous erase operations performed on the particular erase block.

18. A method, comprising:
programming data to erased storage locations within respective erase divisions of a solid-state storage medium; and
erasing selected erase divisions of the solid-state storage medium, wherein erasing a selected erase division comprising a plurality of storage locations comprises:
leaving storage locations of the selected erase division in a non-erased state until a
write capacity threshold is satisfied, the write capacity threshold corresponding to a storage capacity of erased storage locations of the solid-state storage medium, and
reinitializing a first subset of the storage locations of the selected erase division to an erased state in response to determining that the write capacity threshold is satisfied, wherein a second subset of the storage locations remain in the non-erased state in response to reinitializing the storage locations of the first subset.

19. The method of claim 18, wherein satisfying the write capacity threshold comprises determining that that solid-state storage medium comprises fewer than a threshold number of erased storage locations.

20. The method of claim 19, wherein reinitializing the first subset of the storage locations of the selected erase division comprises increasing a number of erased storage locations available on the solid-state storage medium, the method further comprising:
reinitializing the second subset of the storage locations of the selected erase division in response to the number of erased storage locations available on the solid-state storage medium falling below the threshold number.

* * * * *